United States Patent
Oya et al.

(10) Patent No.: US 7,375,755 B2
(45) Date of Patent: May 20, 2008

(54) IMAGE PROCESSING APPARATUS AND METHOD FOR DISPLAYING AN IMAGE AND POSTURE INFORMATION

(75) Inventors: Takahiro Oya, Kanagawa (JP); Teruyuki Higashiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 656 days.

(21) Appl. No.: 10/227,946

(22) Filed: Aug. 27, 2002

(65) Prior Publication Data

US 2003/0052985 A1    Mar. 20, 2003

(30) Foreign Application Priority Data

Aug. 30, 2001  (JP) ............... 2001-260698
Feb. 22, 2002  (JP) ............... 2002-046677

(51) Int. Cl.
*H04N 5/222*     (2006.01)

(52) U.S. Cl. ............ 348/333.02; 348/239; 348/333.11; 348/333.12

(58) Field of Classification Search ............. 348/222.1, 348/239, 333.11, 333.12, 333.01, 333.02, 348/371

See application file for complete search history.

(56) References Cited

U.S. PATENT DOCUMENTS

| | | | |
|---|---|---|---|
| 5,764,291 A * | 6/1998 | Fullam | 348/362 |
| 5,831,670 A * | 11/1998 | Suzuki | 348/208.15 |
| 5,900,909 A * | 5/1999 | Parulski et al. | 348/231.6 |
| 6,022,117 A * | 2/2000 | Tenmyo et al. | 362/17 |
| 6,195,122 B1 * | 2/2001 | Vincent | 348/169 |
| 6,262,769 B1 * | 7/2001 | Anderson et al. | 348/333.1 |
| 6,418,272 B1 | 7/2002 | Higashiyama | 386/104 |
| 6,563,535 B1 * | 5/2003 | Anderson | 348/231.2 |
| 6,597,817 B1 * | 7/2003 | Silverbrook | 382/289 |
| 6,606,117 B1 * | 8/2003 | Windle | 348/239 |
| 6,630,958 B2 * | 10/2003 | Tanaka et al. | 348/333.06 |

FOREIGN PATENT DOCUMENTS

| | | |
|---|---|---|
| JP | 04-145425 | 5/1992 |
| JP | 08-279935 | 10/1996 |
| JP | 09-102893 | 4/1997 |
| JP | 11-24150 | 1/1999 |
| JP | 2000-258683 | 9/2000 |
| JP | 2000-312329 | 11/2000 |
| JP | 2001-211359 | 8/2001 |

* cited by examiner

*Primary Examiner*—Tuan Ho
*Assistant Examiner*—Chriss S Yoder, III
(74) *Attorney, Agent, or Firm*—Fitzpatrick, Cella, Harper & Scinto

(57) ABSTRACT

A camera informs a user of a posture of a camera or availability of the detection and includes an image processing apparatus having a photographing part for taking an image, a posture detecting part for detecting the posture of the photographing part in taking the image, and a display part for displaying information for allowing the user to distinguish the posture detected by the posture detecting part together with the image to be taken by the photographing part.

12 Claims, 16 Drawing Sheets

| FIG. 1A |
| FIG. 1B |

TO FIG. 1B

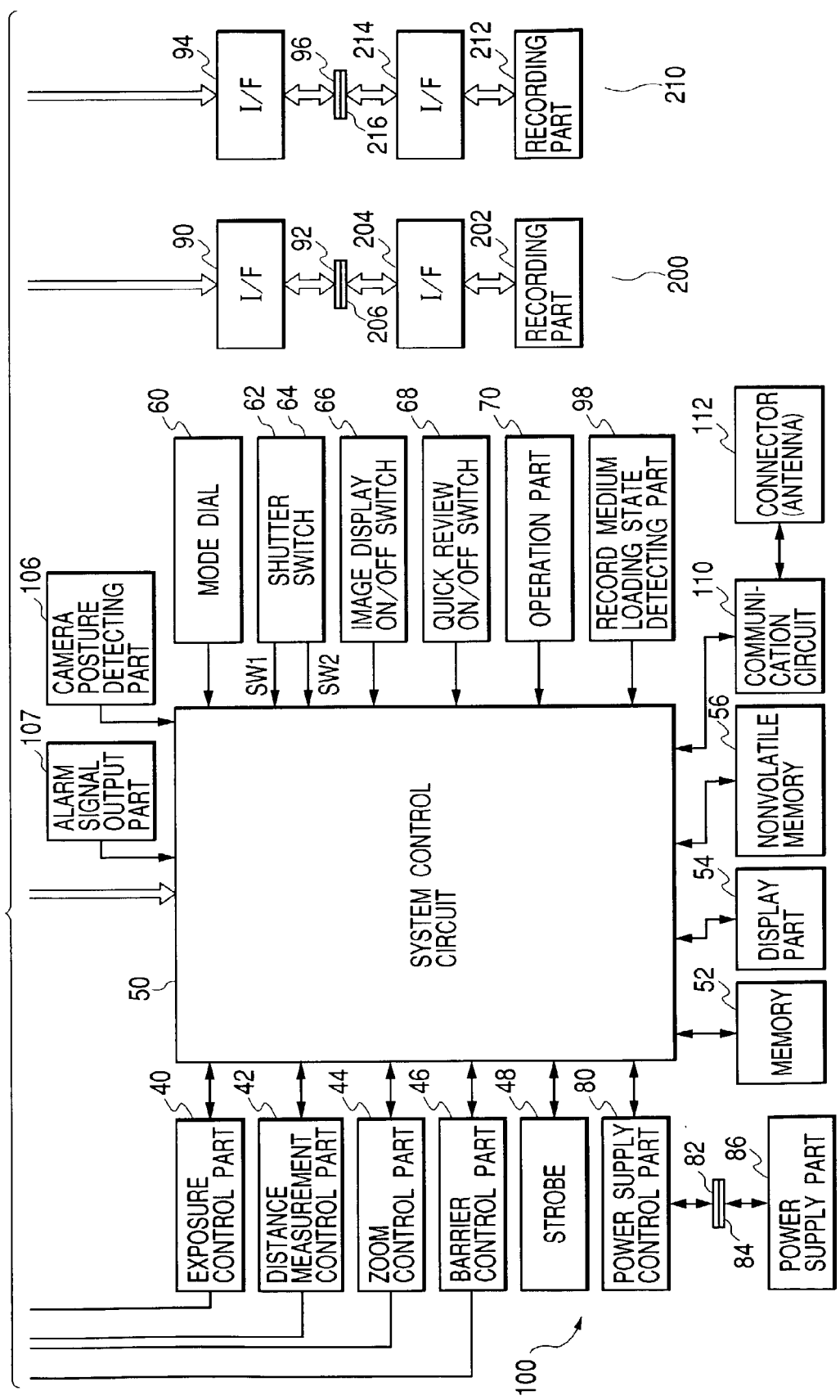

IMAGE PROCESSING APPARATUS AND METHOD FOR DISPLAYING AN IMAGE AND POSTURE INFORMATION

BACKGROUND OF THE INVENTION

1. Field of the Invention

The present invention relates to an image processing apparatus, an image processing method and a record medium having a program computer-readably recorded therein. In particular, the present invention relates to an image processing apparatus and an image processing method, which are capable of grasping in advance the posture of a taken image, and a record medium having a program computer readably recorded therein.

2. Related Background Art

Up to now, an image processing apparatus such as an electronic camera for recording and reproducing still images and moving images with a memory card having a solid-state memory element as a record medium has already been on the market. An electronic camera provided with an electronic finder, such as a color liquid crystal panel, has also been available on the market.

According to these electronic cameras, it is possible for users of the electronic cameras to continuously display images before taking the images and determine the compositions thereof or to reproduce and display taken images and confirm them. In particular, a function of reproducing taken images immediately after taking the images is highly convenient and is a useful function for users of the electronic cameras.

In addition, another electronic camera is also available which is provided with a posture detecting sensor or the like and distinguishes a posture of the camera to change a range for performing distance measurement and photometry according to the posture of the camera. Japanese Patent Application Laid-open No. 2000-312329 discloses an electronic camera that records postures of the camera together with taken images and rotates the images in accordance with a posture of the camera at the time of image taking to reproduce them.

However, such a conventional image processing apparatus, such as an electronic camera does not have a function for informing a user of the posture judged by the camera. In addition, an electronic camera, which records postures of the camera together with taken images and rotates the images in accordance with the posture of the camera at the time of image taking to reproduce them, does not have a function for informing a user of the direction in which a taken image is rotated and displayed at the time of reproduction.

Therefore, in order to enable a user to judge whether the posture determined by a camera coincides with a posture intended by the user, it is considered desirable to improve the camera such that the camera can display the determined posture.

In addition, in a camera incorporating a strobe or a camera having a strobe externally attached, if irradiation is necessary at the time of forced strobe emission or automatic strobe emission, illumination light irradiates a subject regardless of the vertical position and the horizontal position of the camera.

However, although there is no specific problem when the strobe is positioned above a photographing lens regardless of the posture (vertical and horizontal positions) of the camera at the time of image taking, an unnatural shadow is projected on a subject if illumination light irradiates the subject when the strobe is positioned under the photographing lens. For example, as shown in FIG. 20, if there is a wall 302 behind a subject 301, a shadow 303 of the subject 301 is unnaturally projected on the wall 302 behind the subject 301.

In addition, as described in Japanese Patent Application Laid-open No. 11-024150, if a gravity sensor is used as a posture detecting sensor, it is likely that the gravity sensor cannot perform correct posture detection if the elevation angle is equal to or larger than a predetermined angle (e.g., 70 degrees) in such a case where image taking is performed with a photographing lens oriented upward. Thus, an elevation angle sensor is provided in a camera to turn off the gravity sensor when the elevation angle is equal to or larger than the predetermined angle. In this case, positional information of the camera at the time of image taking cannot be recorded in images after taking the images. In addition, the camera does not have a function of informing a user that the camera is in an undetectable state at the time of image taking.

Therefore, if it is likely that a shadow of a subject is unnaturally projected at the time of image taking, it is considered desirable to improve a camera such that the camera can inform a user to that effect in advance. In addition, if a posture of the camera is undetectable, it is considered desirable to improve the camera such that the camera can inform a user to that effect.

SUMMARY OF THE INVENTION

According to an aspect of the present invention, there is provided an image processing apparatus including:

a photographing part for taking an image;

a posture detecting part for detecting a posture of the photographing part in taking the image; and a display part for displaying information for allowing a user to distinguish the posture to be detected by the posture detecting part together with the image to be taken by the photographing part.

According to another aspect of the present invention, there is provided an image processing method including:

an image taking step for taking an image by a photographing part;

a posture detection step for detecting a posture of the photographing part in taking the image by a posture detecting part; and a display step for displaying information for allowing a user to distinguish the posture to be detected by the posture detecting part on a display part together with the image to be taken by the photographing part.

According to yet another aspect of the present invention, there is provided a record medium having a program computer-readably recorded therein, the program executing:

an image taking step for taking an image by a photographing part;

a posture detection step for detecting a posture of the photographing part in taking the image by a posture detecting part; and a display step for displaying information for allowing a user to distinguish the posture to be detected by the posture detecting part on a display part together with the image to be taken by the photographing part.

According to still another aspect of the present invention, there is provided an image processing apparatus including:

a photographing part for taking an image via a lens;

a light emission part for irradiating a subject with illumination light;

a posture detecting part for detecting a posture of the image processing apparatus; and a display part for performing alarm display when it is judged from a posture detected by the posture detecting part that the light emission part is positioned under the lens.

DESCRIPTION OF THE PREFERRED EMBODIMENTS

Embodiments of the present invention will be hereinafter described in detail with reference to the accompanying drawings.

Figures 1, 1A:
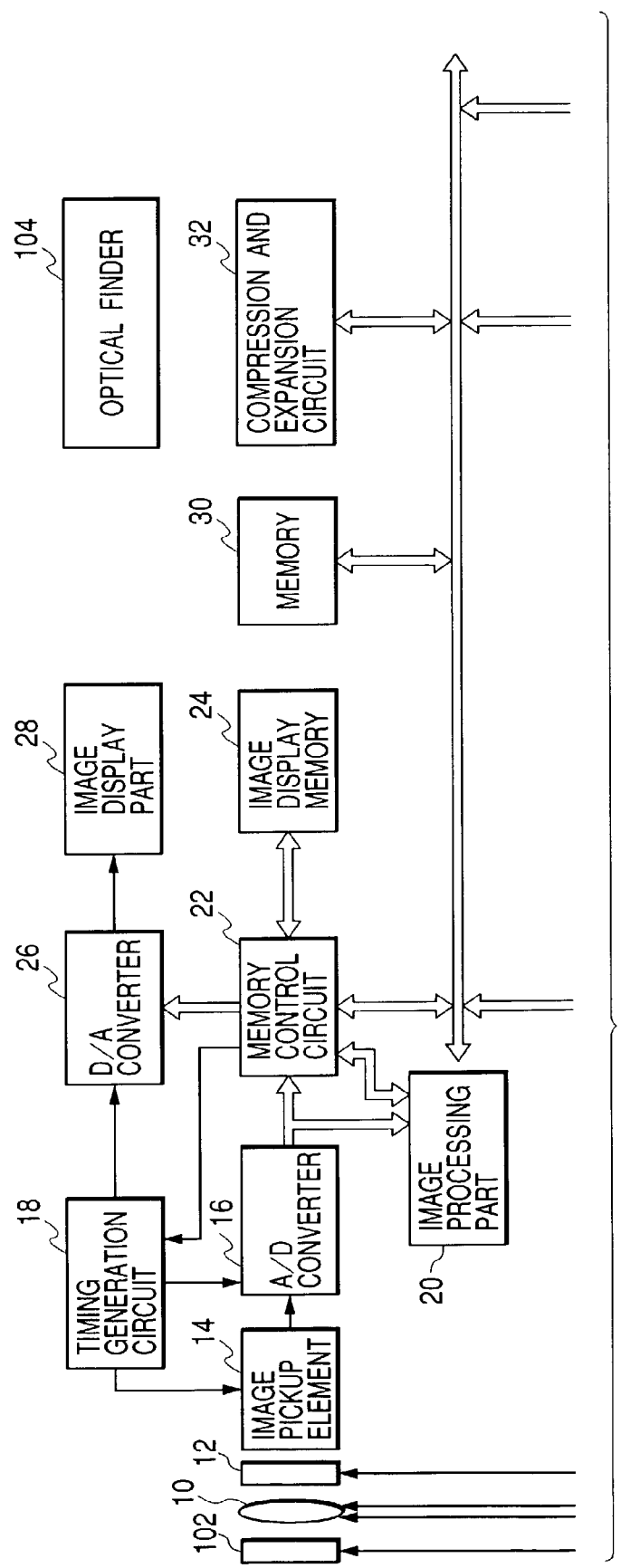
FIG. 1 shows the relationship between FIGS. 1A and 1B, and FIGS. 1A and 1B are schematic structural views of an image processing apparatus.

FIGS. 1A and 1B are diagrams showing the schematic structure of an image processing apparatus in a first embodiment of the present invention. In FIGS. 1A and 1B, reference numeral 100 denotes an image processing apparatus. Reference numeral 10 denotes a photographing lens; reference numeral 12 denotes a shutter provided with a lens stop function; reference numeral 14 denotes an image pickup element for converting an optical image into an electric signal; and reference numeral 16 denotes an A/D converter for converting an analog signal output of the image pickup element 14 into a digital signal.

Reference numeral 18 denotes a timing generation circuit for supplying a clock signal or a control signal to the image pickup element 14, the A/D converter 16 and a D/A converter 26, which is controlled by a memory control circuit 22 and a system control circuit 50. Reference numeral 20 denotes an image processing circuit, which applies a predetermined image pixel interpolation process or color conversion process to data from the A/D converter 16 or data from the memory control circuit 22.

In addition, in the image processing circuit 20, a predetermined arithmetic operation process is performed using picked up image data, and the system control circuit 50 performs an AF (auto focus) process, an AE (automatic exposure) process and an EF (strobe pre-light emission) process of a TTL (through the lens) system that controls an exposure control part 40 and a distance measurement control part 42 based on the obtained arithmetic operation results.

Moreover, in the image processing circuit 20, a predetermined arithmetic operation process is performed using picked up image data, and an AWB (auto-white balance) process of the TTL system is also performed based on the obtained arithmetic operation results.

Reference numeral 22 denotes a memory control circuit, which controls the A/D converter 16, the timing generation circuit 18, the image processing circuit 20, an image display memory 24, the D/A converter 26, a memory 30, and a compression and expansion circuit 32. Data of the A/D converter 16 is written in the image display memory 24 or the memory 30 via the image processing circuit 20 and the memory control circuit 22 or directly via the memory control circuit 22.

Reference numeral 24 denotes an image display memory; reference numeral 26 denotes a D/A converter; and reference numeral 28 denotes an image display part consisting of a TFT LCD, or the like. Image data for display written in the image display memory 24 is displayed by the image display part 28 via the D/A converter 26. If picked up image data is displayed one by one using the image display part 28, it is possible to realize an electronic finder function. In addition, the image display part 28 is capable of arbitrarily turning ON/OFF the display according to an instruction of the system control circuit 50. When the display is turned OFF, power consumption of the image processing apparatus 100 can be reduced significantly.

Reference numeral 30 denotes a memory for storing taken still images or moving images, which is provided with a memory capacity sufficient for storing predetermined pieces of still images or moving images of a predetermined duration. Consequently, even in the case of continuous image talking for continuously taking a plurality of pieces of still images or panoramic image taking, it becomes possible to write images in the memory 30 at a high speed and in a large volume. In addition, the memory 30 can also be used as a work area of the system control circuit 50.

Reference numeral 32 denotes a compression and expansion circuit for compressing and expanding image data by an applied discrete cosine transformation (ADCT) or the like, which reads out an image stored in the memory 30 to apply a compression process or expansion process to the image and writes processed data in the memory 30. Reference numeral 40 denotes an exposure control part for controlling the shutter 12 provided with a lens stop function, which cooperates with a strobe 48 to obtain a strobe light intensity control function.

Reference numeral 42 denotes a distance measurement control part for controlling focusing of the photographing lens 10; reference numeral 44 denotes a zoom control part for controlling zooming of the photographing lens 10; and reference numeral 46 denotes a barrier control circuit for controlling operations of a protective member 102 functioning as a barrier. Reference numeral 48 denotes a strobe, which also has a projecting light function of AF auxiliary light and a strobe light intensity control function.

The exposure control part 40 and the distance measurement control part 42 are controlled using the TTL system. The system control circuit 50 controls the exposure control part 40 and the distance measurement control part 42 based on arithmetic operation results obtained by performing an arithmetic operation on picked up image data by the image processing circuit 20.

Reference numeral 50 denotes a system control circuit for controlling the entire image processing apparatus 100 and reference numeral 52 denotes a memory for storing constants, variables, programs and the like for operations of the system control circuit 50.

Reference numeral 54 denotes a display part such as a liquid crystal display device or a speaker that indicates an operation state, a message or the like using characters, images, voices and the like in accordance with the execution of programs in system control circuit 50. The display part 54 is installed in a single or plural form in a position where it can be visually recognized easily around an operation part of the image processing apparatus 100 and is constituted by, for example, a combination of an LCD, an LED, a sound generating element and the like.

In addition, a part of the functions of the display part 54 is provided inside an optical finder 104. Among the displayed contents of the display part 54, those displayed on the LCD or the like include a single shot/continuous shooting display, a self-timer display, a compression ratio display, a number of recorded image pixels display, a number of recorded pieces display, a remaining number of frames display, a shutter speed display, a stop value display, an exposure correction display, a strobe display, a red-eye relaxation display, a macro photographing display, a buzzer set display, a remaining amount of battery for clock display, a remaining amount of battery display, an error display, an information display by a numeral of plural digits, an attached and detached state display of record media 200 and 210, a communication I/F operation display, a date and time display, and the like.

In addition, among the displayed contents of the display part 54, those displayed inside the optical finder 104 include a focusing display, a hand vibration warning display, a strobe position warning display, a strobe charge display, a shutter speed display, a stop value display, an exposure correction display, and the like.

Reference numeral 56 denotes an electrically erasable and recordable nonvolatile memory. For example, an EEPROM or the like is used as the memory. Reference numerals 60, 62, 64, 66, 68 and 70 denote operation members for inputting various operation instructions of the system control circuit 50, which are constituted by a single or a plurality of combinations of a switch, a dial, a touch panel, pointing by visual detection, a voice recognition device, and the like. Here, these operation members will be specifically described.

Reference numeral 60 denotes a mode dial switch, which can switch and set each function mode such as power supply OFF, an automatic image taking mode, an image taking mode, a panoramic image taking mode, a reproduction mode, a multi-screen reproduction/erasing mode, and a PC connection mode.

Reference numeral 62 denotes a shutter button SW1, which is turned ON while a shutter button 63 discussed later is operated and instructs the start of operation of an AF (auto focus) process, an AE (automatic exposure) process, an AWB (auto-white balance) process, an EF (strobe pre-light emitting) process, and the like.

Reference numeral 64 denotes a shutter button SW2, which is turned ON upon completion of operation of a shutter button 63 discussed later and instructs the start of operation of a series of processes, that is, an exposure process for writing a signal read out from the image pickup element 14 in the memory 30 via the A/D converter 16 and the memory control circuit 22 as image data, an imaging process using arithmetic operation in the image processing circuit 20 and the memory control circuit 22 and a recording process for reading out the image data from the memory 30, compressing the image data in the compression and expansion circuit 32 and writing the image data in the record medium 200 or 210. Reference numeral 66 denotes an image display ON/OFF switch, which can set ON/OFF of the image display part 28. In performing image taking using the optical finder 104, the supply of an electric current to an image display part consisting of a TFT LCD, or the like is cut off by this function, whereby it becomes possible to realize a saving of electric power.

Reference numeral 68 denotes a quick review ON/OFF switch, which sets a quick review function for automatically reproducing taken image data immediately after images taking. Further, in this embodiment, in particular, a function is provided which sets the quick review function if the image display part 28 is turned OFF.

Reference numeral 70 denotes an operation part consisting of various buttons, a touch panel and the like, which includes a menu button, a set button, a macro button, a multi-screen reproduction and page-break button, a strobe setting button, a single shooting/continuous shooting/self-timer switching button, a menu shift plus button, a menu shift minus button, a reproduced image shift plus button, a reproduced image minus button, a taken image quality selection button, an exposure correction button, a data/time setting button and the like.

Reference numeral 80 denotes a power supply control part, which is constituted by a battery detection circuit, a DC-DC converter, a switch circuit for switching blocks to be energized, and the like. The power supply control part 80 detects presence or absence of loading of a battery, the type of the battery and the residual amount of battery power, controls the DC-DC converter based on results of the detection and an instruction of the system control circuit 50 and supplies the necessary voltage to each part including record media for a necessary period.

Reference numerals 82 and 84 denote connectors and reference numeral 86 denotes a power supply part consisting of a primary battery such as an alkali battery or a lithium battery, a secondary battery such as an NiCd battery, an NiMH battery or an Li battery, an AC adapter, and the like.

Reference numerals 90 and 94 denote interfaces with record media such as a memory card and a hard disk; reference numerals 92 and 96 denote connectors for connecting with the record media such as a memory card and a hard disk; reference numeral 98 denotes a record medium loading state detecting part for detecting whether or not the record medium 200 or 210 is inserted in the connector 92 and/or 96.

Note that, in this embodiment, descriptions are provided on the assumption that the image processing apparatus has two systems of interfaces and connectors to which record media are attached. It is needless to mention that the image processing apparatus may have a single or a plurality of systems as interfaces and connectors to which record media are attached. In addition, the image processing apparatus may be provided with different standards of interfaces and connectors in combination. As interfaces and connectors, those conforming to standards such as a PCMCIA card and a CF (Compact Flash®) card may be used.

Moreover, if the interfaces 90 and 94 and the connectors 92 and 96 are constituted using those conforming to the standards such as the PCMCIA card and the CF (Compact Flash®) card, image data and management information attached to the image data can be exchanged with other computers and peripheral equipment such as printers by connecting various communication cards such as an LAN card, a modem card, a USB card, an IEEE1394 card, a P1284 card, an SCSI card, a communication card such as PHS, and the like.

Reference numeral 102 denotes a protective member functioning as a barrier for covering an image pickup part including the lens 10 of the image processing apparatus 100, thereby preventing contamination and breakage of an image pickup part. Reference numeral 104 denotes an optical finder. Image taking can be performed using only the optical finder 104 without using an electronic finder function of the image display part 28. In addition, inside the optical finder 104, there are provided functions of a part of the display part 54, for example, focusing display, hand vibration alarm display, strobe position alarm display, strobe charge display, shutter speed display, stop value display, and exposure correction display.

Figure 2:
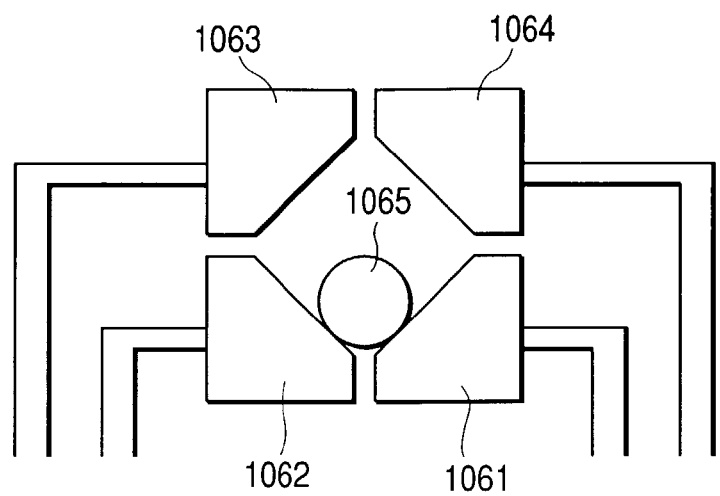
FIG. 2 is a structural view of a gravity sensor functioning as a posture detecting sensor.

Reference numeral 106 denotes a camera posture detecting part, which detects a posture state of the image processing apparatus 100, that is, a direction of an image pickup surface of the image pickup element 14 provided in the apparatus. As a sensor for detecting a posture state, for example, a gravity sensor is used. As shown in FIG. 2, the gravity sensor is constituted by four detection pieces 1061, 1062, 1063 and 1064 and a conductive sphere 1065. The detection pieces 1061, 1062, 1063 and 1064 are arranged in two columns vertically and are horizontally spaced apart from each other by a predetermined interval. A slope with which the conductive sphere 1065 comes into contact is formed on each of the detection pieces 1061 to 1064, and the slopes of the adjacent two detection pieces form a 90 degrees angle. The conductive sphere 1065 is a hollow sphere and is formed in a size for allowing it to come into contact with the adjacent two slopes among the slopes of the four detection pieces 1061 to 1064. The posture state of a camera can be detected by determining the detection piece with which the conductive sphere 1065 is in contact.

Figure 3:
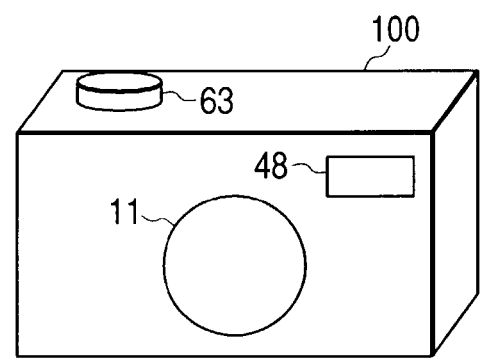
FIG. 3 is a perspective view showing a horizontal position of the image processing apparatus.

For example, if the camera is in a posture shown in FIG. 3, the detection pieces 1061 and 1062 communicate with each other via the conductive sphere 1065. If the camera is in a posture inverted from this state, the detection pieces 1063 and 1064 communicate with each other via the conductive sphere 1065. Further, reference numeral 63 denotes a shutter button that is a member for instructing an image taking operation, and reference numeral 11 denotes a lens-barrel having the photographing lens 10, the shutter 12 and the protective member 102 therein. In addition, if the camera is in a posture shown in FIG. 4, the detection pieces 1061 and 1064 communicate with each other via the conductive sphere 1065. If the camera is in a posture inverted from this state, the detection pieces 1062 and 1063 communicate with each other via the conductive sphere 1065.

Figure 5:
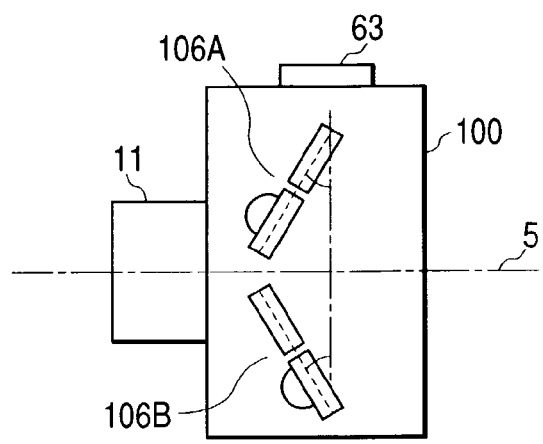
FIG. 5 is a view showing an arrangement of gravity sensors viewed from a side of an image processing apparatus main body.

Moreover, as shown in FIG. 5, the gravity sensors 106A and 106B are arranged above and below an optical axis of the camera, respectively. The gravity sensor 106A is arranged to be slanted by a predetermined angle such that its surface on the front side of the camera consisting of the detection pieces 1061 to 1064 faces obliquely upward in the camera. The gravity sensor 106B is arranged to be slanted by a predetermined angle such that its surface on the front side of the camera consisting of the detection pieces 1061 to 1064 faces obliquely downward in the camera.

Figure 6:
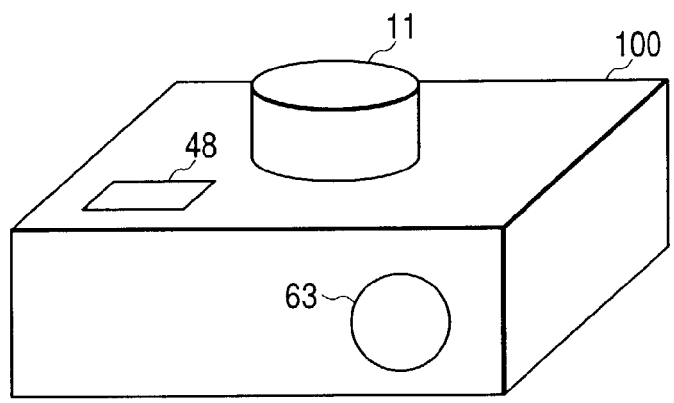
FIG. 6 is a perspective view showing the image forming apparatus in a state where a photographing lens faces upward.

When the elevation angle of this gravity sensor 106A is equal to or larger than a predetermined angle (e.g., 70 degrees), it is likely that the conductive sphere 1065 of the gravity sensor 106A is not placed in a regular position. When the elevation angle of the gravity sensor 106B is equal to or larger than a predetermined angle (e.g., 70 degrees), it is likely that the conductive sphere 1065 of the gravity sensor 106B is not placed in a regular position. In such a case, outputs of the gravity sensors 106A and 106B may not be the same. In particular, as shown in FIG. 6, when the photographing lens 10 of the camera faces right upward, both the elevation angles of the gravity sensors 106A and 106B are equal to or larger than the predetermined angle, and output information of the two gravity sensors does not coincide with each other. In this way, if output information of the two gravity sensors does not coincide with each other, the system control circuit 50 determines that detection of a posture of the camera is impossible.

Back in FIGS. 1A and 1B, reference numeral 107 denotes an alarm signal output part, which performs alarm display in the image display part and the finder according to an output of the camera posture detecting part 106.

Reference numeral 110 denotes a communication circuit, which has various communication functions such as RS232C, USB, IEEE1394, P1284, SCSI, modem, LAN, wireless communication and the like.

Reference numeral 112 denotes a connector for connecting the image processing apparatus 100 with other apparatuses by the communication circuit 110 or denotes an antenna in the case of wireless communication. Reference numeral 200 denotes a record medium such as a memory card or a hard disk. The record medium 200 is provided with a record part 202 consisting of a semiconductor memory, a magnetic disk or the like, an interface 204 with the image processing apparatus 100 and a connector 206 for connection with the image processing apparatus 100.

Reference numeral 210 denotes a record medium such as a memory card or a hard disk. The record medium 210 is provided with a record part consisting of a semiconductor memory, a magnetic disk or the like, an interface 214 with the image processing apparatus 100, and a connector 216 for connection with the image processing apparatus 100.

Figure 7:
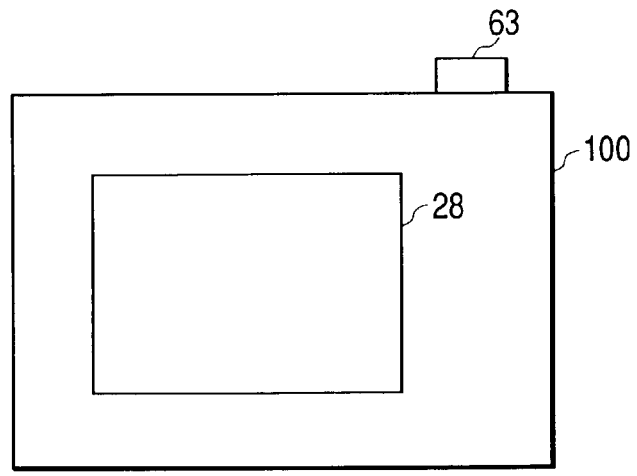
FIG. 7 is a rear view of the image processing apparatus.

FIG. 7 is a rear view of the image processing apparatus in this embodiment. When the shutter button 63 is depressed in nearly halfway, the shutter button SW1 is turned ON. When the shutter button 63 is fully depressed in, the shutter button SW2 is turned ON. Reference numeral 28 denotes an image display part consisting of a TFT LCD, or the like, on which a taken image is displayed and, at the same time, an icon representing information of a camera is displayed. Information to be displayed includes the posture of the camera, the compression ratio, a size, an exposure correction value, the white balance, a distance measurement system, a photometry system and the like.

Figure 8:
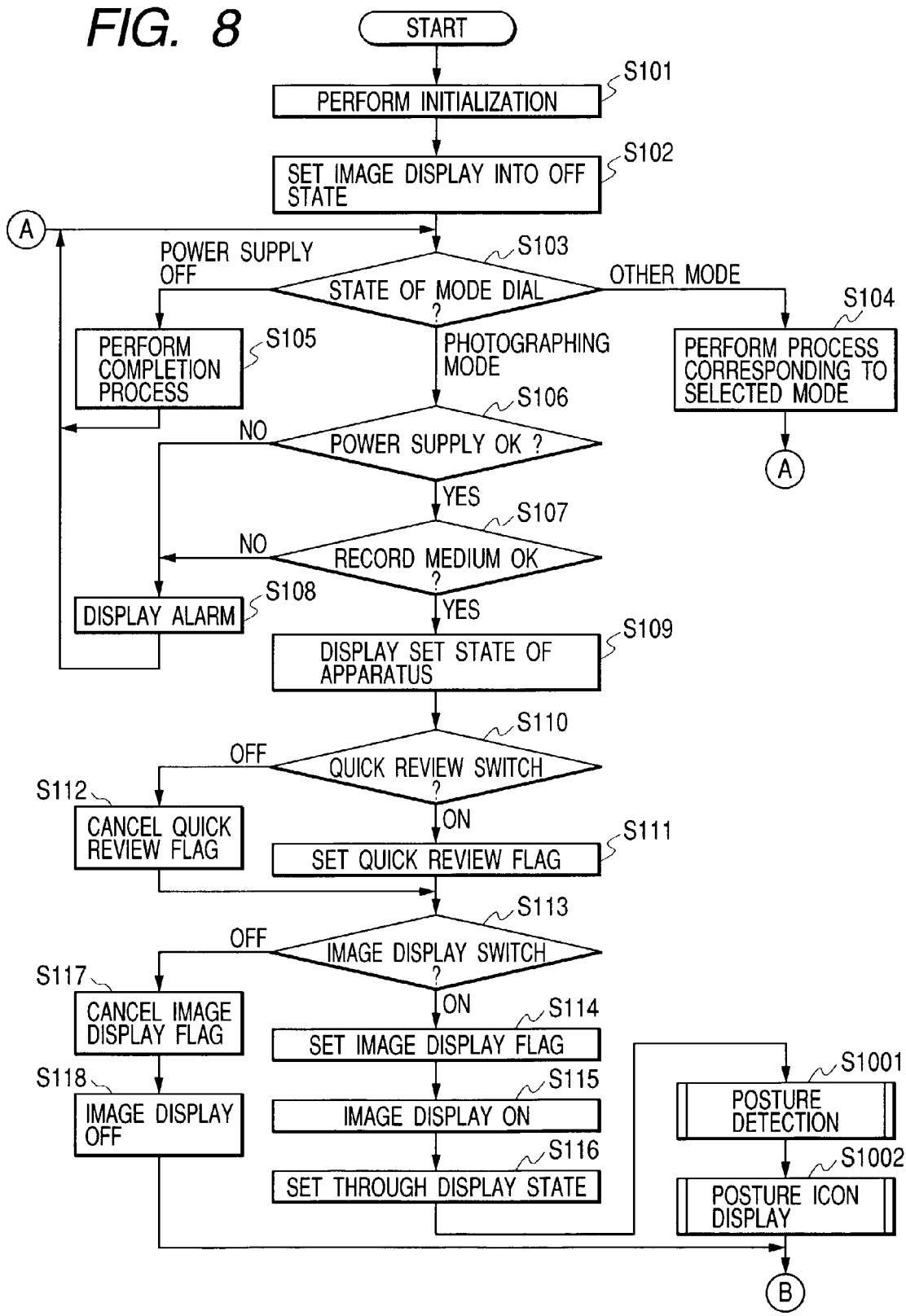
FIG. 8 is a flow chart showing a part of a main routine of the image processing apparatus.
Figure 9:
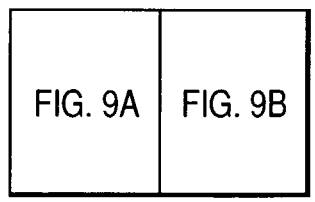
FIG. 9 shows the relationship between FIGS. 9A and 9B and FIGS. 9A and 9B are flow charts showing the remaining parts of the main routine of the image processing apparatus.
Figure 9A:
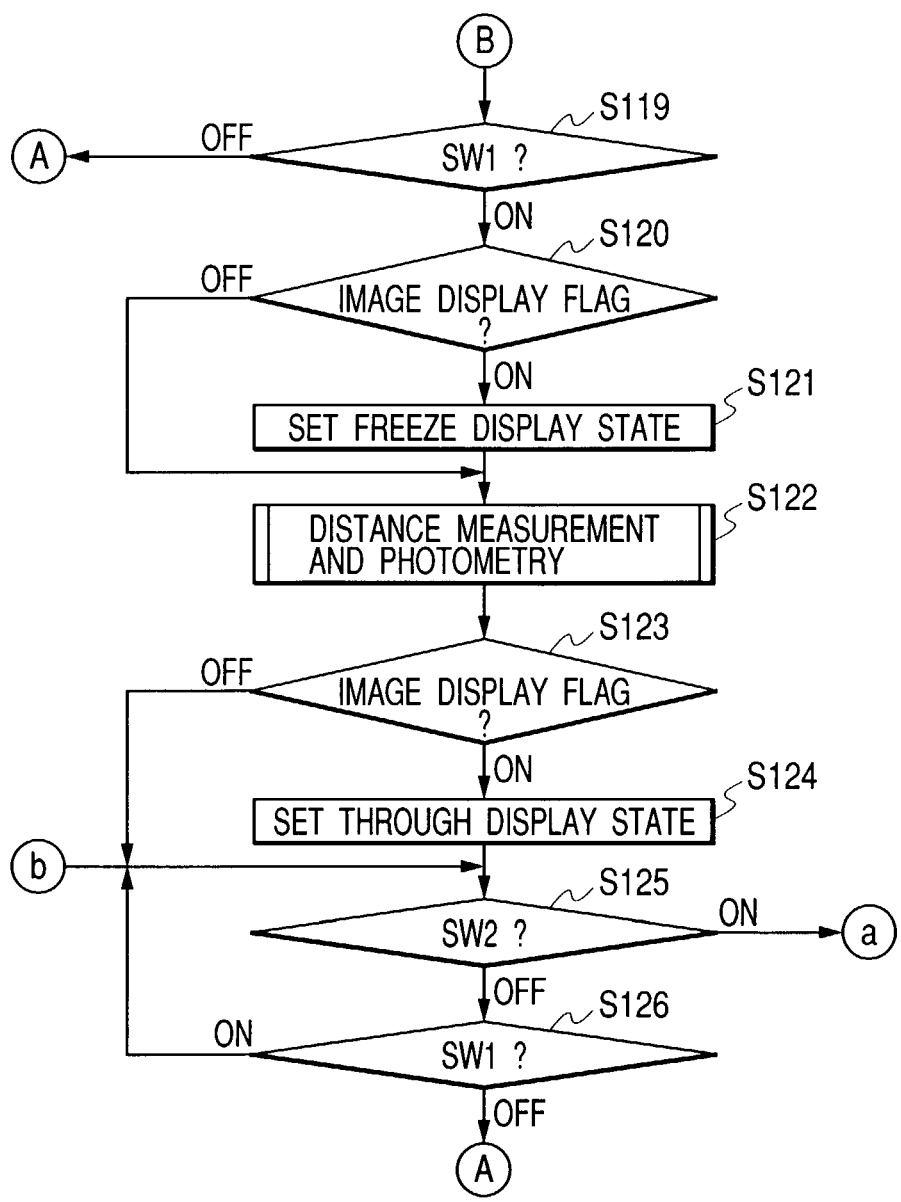
Figure 9B:
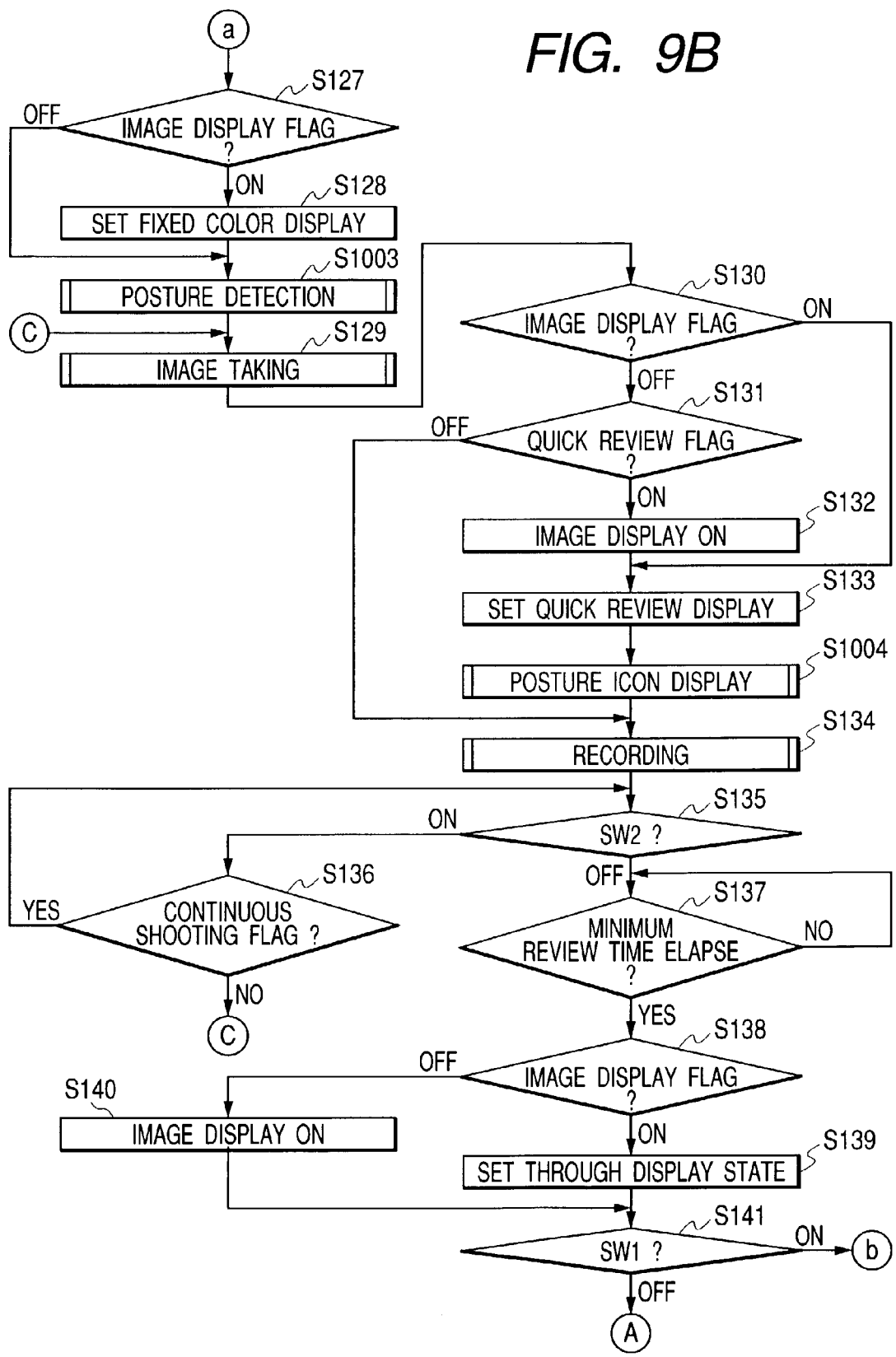

Next, an embodiment of the image processing apparatus will be described with reference to FIGS. 8 to 16. FIGS. 8, 9A and 9B are flow charts showing a main routine of the image processing apparatus 100 of this embodiment. First, operations of the image processing apparatus 100 will be described with reference to FIGS. 8, 9A and 9B.

Upon the input of a power supply such as replacement of a battery, the system control circuit 50 initializes flags, control variables and the like (S101) and initially sets image display of the image display part 28 into the OFF state (S102). The system control circuit 50 determines a set position of the mode dial 60 and, if the mode dial 60 is set in power supply OFF position (S103), changes display of each display part to an end state. Then, the system control circuit 50 performs predetermined completion process such as closing the barrier of the protective member 102 to protect the image pickup part, recording necessary parameters including flags, control variables and the like, set values and set modes in the nonvolatile memory 56, and cutting off unnecessary power supply to each part of the image processing apparatus 100 including the image display part 28 by the power supply control part 80 (S105) and, then, returns to S103.

If the mode dial 60 is set in the image taking mode (S103), the system control circuit 50 advances the flow to S106. If the mode dial 60 is set in the other modes (S103), the system control circuit 50 executes a process corresponding to a selected mode (S104) and, upon completing the process, the flow returns to S103.

The system control circuit 50 determines whether or not the residual capacity and the operation state of the power supply 86 constituted by a battery or the like have problems for performing the operations of the image processing apparatus 100 by the power supply control part 80 (S106) and, if there is a problem, performs a predetermined alarm display by an image or voice using the display part 54 (S108) and, then, the flow returns to S103.

If there is no problem in the power supply 86 (S106), the system control circuit 50 determines whether or not the operation state of the record medium 200 or 210 has problems for the operation of the image processing apparatus 100, in particular, a record and reproduction operation of image data with respect to the record medium (S107) and, if there is a problem, performs predetermined alarm display by an image or voice using the display part 54 (S108) and, then, the flow returns to S103.

If there is no problem in the operation state of the record medium 200 or 210 (S107), the system control circuit 50 performs display of various set states of the image processing apparatus 100 by an image or voice using the display part 54 (S109). Further, if image display of the image display part 28 is ON, the system control circuit 50 performs display of various set states of the image processing apparatus 100 by an image or voice using the image display part 28 as well.

The system control circuit 50 checks the set state of the quick review ON/OFF switch 68 (S110). If the quick review ON/OFF switch 68 is set in quick review ON state, the system control circuit 50 sets a quick review flag (S111). If the quick review ON/OFF switch 68 is set in a quick review OFF state, the system control circuit 50 cancels the quick review flag (S112). Further, the states of the quick review flags are stored in an internal memory of the system control circuit 50 or the memory 52.

Subsequently, the system control circuit 50 checks the set state of the image display ON/OFF switch 66. If the image display ON/OFF switch 66 is set in the image display ON state, the system control circuit 50 sets an image display flag (S114) and, at the same time, sets image display of the image display part 28 in the ON state (S115). Further, the system control circuit 50 sets a through display state for sequentially displaying taken image data (S116), detects a camera posture (S1001), displays a state of the detected posture as an icon (S1002) and advances the flow to S119. The detection process of the camera posture (S1001) and the display process of a camera posture icon (S1002) will be described later with reference to FIGS. 15 and 16, respectively.

In the through display state, the system control circuit 50 sequentially displays data, which is sequentially written in the image display memory 24 via the image pickup element 12, the A/D converter 16, the image processing circuit 20 and the memory control circuit 22, by the image display part 28 via the memory control circuit 22 and the D/A converter 26, thereby realizing an electronic finder function.

If the image display ON/OFF switch 66 is set in the image display OFF state (S113), the system control circuit 50 cancels an image display flag (S117) and, at the same time, sets the image display of the image display part 28 in the OFF state (S118) and advances the flow to S119. In the case of the image display OFF state, the system control circuit 50 performs image taking using the optical finder 104 without using the electronic finder function of the image display part 28. In this case, it becomes possible to reduce electric power consumption of the image display part 28, the D/A converter 26 and the like that consumes a large amount of electric power. Further, states of the image display flag are stored in the internal memory of the system control circuit 50 or the memory 52.

If the shutter button SW1 is not depressed (S119), the flow returns to S103. If the shutter button SW1 is depressed (S119), the system control circuit 50 judges a state of the image display flag to be stored in the internal memory of the system control circuit 50 or the memory 52 (S120) and, if the image display flag is set, sets the display state of the image display part 28 to the freeze display state (S121) and advances the flow to S122.

In the freeze display state, the system control circuit 50 prohibits rewriting of image data of the image display memory 24 via the image pickup element 12, the A/D converter 16, the image processing circuit 20 and the memory control circuit 22 and displays last written image data by the image display part 28 via the memory control circuit 22 and the D/A converter 26, thereby displaying a frozen image on the electronic finder. If the image display flag is cancelled (S120), the system control circuit 50 advances the flow to S122.

The system control circuit 50 performs a distance measurement process to focus the photographing lens 10 on a subject and performs a photometry process to determine the stop value and the shutter time (S122). In the photometry process, the system control circuit 50 also performs setting of a strobe, if necessary. Details of the distance measurement and photometry processes performed on S122 will be described later with reference to FIG. 10.

Upon completion of the distance measurement and photometry processes performed on S122, the system control circuit 50 determines a state of the image display flag to be stored in the internal memory of the system control circuit 50 or the memory 52 (S123) and, if the image display flag is set, the system control circuit 50 sets the display state of the image display part 28 to the through display state (S124) and advances to S125. Note that the through display state in S124 is the same operation state as the through state in S116.

If the shutter button SW2 is not depressed (S125) and, moreover, the shutter button SW1 is cancelled (S126), the flow returns to S103. If the shutter button SW2 is depressed (S125), the system control circuit 50 determines a state of an image display flag to be stored in the internal memory of the system control circuit 50 or the memory 52 (S127) and, if the image display flag is set, sets a display state of the image display part 28 to a fixed color display state (S128) and advances the flow to S1003.

In the fixed color display state, the system control circuit 50 displays image data of a replaced fixed color in the image display part 28 via the memory control circuit 22 and the D/A converter 26 instead of taken image data written in the image display memory 24 via the image pickup element 12, the A/D converter 16, the image processing circuit 20, and the memory control circuit 22, thereby displaying an image of the fixed color in the electronic finder. If the image display flag is cancelled (S127), the system control circuit 50 advances the flow to S1003. The system control circuit 50 detects the camera posture (S1003) and, then, advances the flow to S129. A camera posture detection process will be described later with reference to FIG. 15.

The system control circuit 50 executes an image taking process consisting of an exposure process for writing taken image data in the memory 30 via the image pickup element 12, the A/D converter 16, the image processing circuit 20 and the memory control circuit 22 or directly via the memory control circuit 22 from the A/D converter 16 and an imaging process for reading out image data written in the memory 30 to perform various processes (S129). Details of this image taking process performed in S129 will be described later with reference to FIG. 11.

The system control circuit 50 determines a state of an image display flag to be stored in the internal memory of the system control circuit 50 or the memory 52 (S130) and, if the image display flag is set, performs quick review display (S133). In this case, the image display part 28 is always displayed as the electronic finder even during image taking, and quick review display immediately after the image taking is also performed.

If the image display flag is cancelled (S130), the system control circuit 50 determines a state of a quick review flag to be stored in the internal memory of the system control circuit 50 or the memory 52 (S131) and, if the quick review flag is set, sets image display of the image display part 28 to the ON state (S132) and performs quick review display (S133).

After performing the quick review display (S133), the system control circuit 50 performs a posture icon display process in order to display the posture of the camera in the form of an icon (S1004). Details of the posture icon display process will be described later with reference to FIG. 16.

In this way, according to this embodiment, electric power is saved or the electronic finder function is unnecessary because image taking is performed using the optical finder 104. Thus, even if image display of the image display part 28 is set to OFF, it becomes possible to automatically reproduce a taken image on the image display part 28 immediately after image taking if the quick review function is set by a quick review switch. In addition, it becomes possible to provide a function convenient for electric power saving and confirmation of a taken image.

If the image display flag is cancelled (S130) and the quick review flag is also cancelled (S131), the system control circuit 50 advances the flow to S134 while the image display part 28 is still in the OFF state. In this case, the image display part 28 is still off even after image taking is performed and quick review display is not performed either. This is a method in which confirmation of a taken image immediately after image taking is unnecessary as in the case where image taking is continued using the optical finder 104 and importance is attached to electric power saving without using the electronic finder function of the image display part 28.

The system control circuit 50 reads out taken image data written in the memory 30 and performs various image processes using the memory control circuit 22 and, if necessary, the image processing circuit 20 and an image compression process according to a set mode using the compression and expansion circuit 32 and, then, executes a record process for writing image data in the record medium 200 or 210 (S134). Details of this record process performed in S134 will be described later with reference to FIG. 12.

When the record process 134 is completed, if the shutter button SW2 is depressed (S135), the system control circuit 50 determines a state of a continuous shooting flag to be stored in the internal memory of the system control circuit 50 or the memory 52 (S136) and, if the continuous shooting flag is set, the flow returns to S129 in order to continuously perform image taking and performs the next image taking operation. If the continuous shooting flag is not set (S136), the system control circuit 50 repeats the present process until the shutter button SW2 is released (S135).

In this way, according to this embodiment, in the case of an operation setting state for performing quick review display immediately after image taking, if the shutter button SW2 is depressed when the record process performed in S134 is completed, it is possible to continue the quick review display in the image display part 28 until the shutter button SW2 is released and elaborately perform confirmation of a taken image.

If the shutter button SW2 is released when the record process performed in S134 is completed or if the shutter button SW2 is released after continuously pressing the shutter button SW2 and continuing the quick review display to perform confirmation of taken images (S135), the system control circuit 50 advances the flow to S138 after a predetermined minimum review time has elapsed (S137).

In this way, according to this embodiment, the quick review display in the image display part 28 is continued for a predetermined time, whereby it becomes possible to surely perform confirmation of a taken image and, at the same time, it is possible to prevent the quick review display from being continued for a long time unnecessarily to lose the next image taking chance.

Further, this minimum review time may be a fixed value, may be set by a user arbitrarily or may be set or selected by a user arbitrarily within a predetermined range.

If the image display flag is set (S138), the system control circuit 50 sets a display state of the image display part 28 to the through display state (S139) and advances the flow to S141. It is possible to set the display state to the through display state for sequentially displaying picked up image data for the next image taking after confirming a taken image by the quick review display in the image display part 28.

If the image display flag is cancelled (S138), the system control circuit 50 sets image display of the image display part 28 to the OFF state (S140) and advances the flow to S141. In this case, it becomes possible to stop the function of the image display part 28 for electric power saving after confirming a taken image by the quick review display in the image display part 28 and reduce electric power consumption of the image display part 28, the D/A converter 26 and the like that consume a large amount of electric power.

If the shutter button SW1 is depressed (S141), the system control circuit 50 returns to S125 to prepare for the next image taking. If the shutter button SW1 is released (S141), the system control circuit 50 completes a series of image taking operations and the flow returns to S103.

Figure 10:
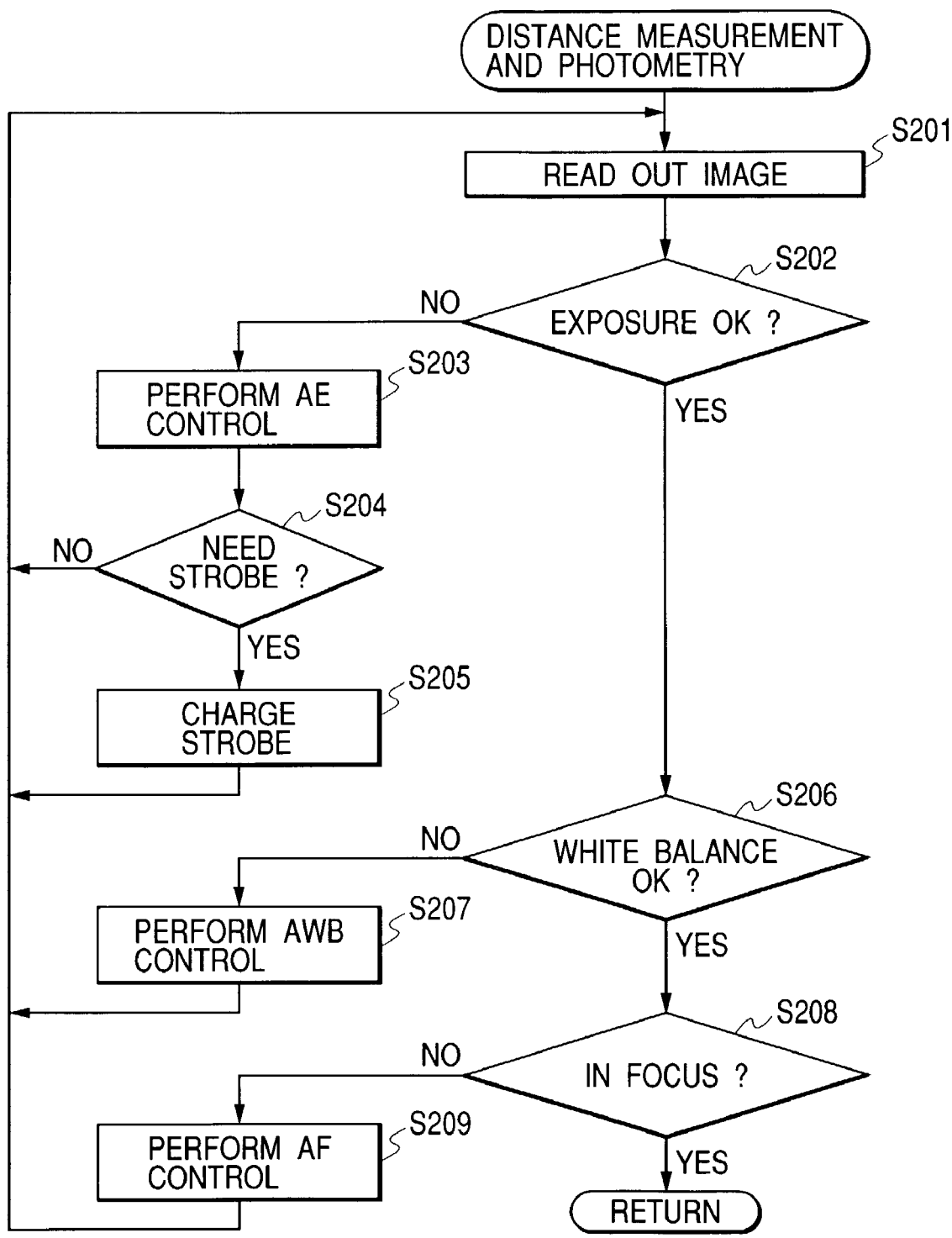
FIG. 10 is a flow chart showing a distance measurement and photometry routine of the image processing apparatus.

FIG. 10 is a flow chart showing a detailed flow of a distance measurement and photometry process in S122 of FIGS. 9A and 9B. The system control circuit 50 reads out a charge signal from the image pickup element 14 and sequentially reads taken image data in the image processing circuit 20 via the A/D converter 16 (S201). Using the sequentially read image data, the image processing circuit 20 performs a predetermined arithmetic operation to be used in the AE (automatic exposure) process, the EF (strobe pre-light emission) process and the AF (auto-focus) process of the TTL (through the lens) system.

Further, each process in this context cuts and extracts a necessary number of specific parts according to necessity among a total number of taken image pixels and uses them in the arithmetic operation. Consequently, in each process of AE, EF, AWB and AF of the TTL system, it becomes possible to perform an optimal arithmetic operation for each different mode such as a center weighted mode, an average mode and an evaluation mode.

Using results of the arithmetic operation in the image processing circuit 20, the system control circuit 50 performs the AE control using the exposure control part 40 (S203) until it is determined that exposure (AE) is proper (S202). Using measurement data obtained by the AE control, the system control circuit 50 determines whether or not light emission by a strobe is necessary (S204) and, if light emission by a strobe is necessary, sets a strobe flag and charges the strobe 48 (S205). If it is determined that the exposure (AE) is proper (S202), the system control circuit 50 stores the measurement data or set parameters in the internal memory of the system control circuit 50 or the memory 52.

Using the results of the arithmetic operation in the image processing circuit 20 and the measurement data obtained by the AE control, the system control circuit 50 adjusts parameters of a color process using the image processing circuit 20 to perform the AWB control (S207) until it is determined that the white balance (AWB) is proper (S206).

If it is determined that the white balance (AWB) is proper (S206), the system control circuit 50 stores the measurement data and the set parameters in the internal memory of the system control circuit 50 or the memory 52.

Using the measurement data obtained by the AE control and the AWB control, the system control circuit 50 performs the AF control using the distance measurement control part 42 (S209) until it is determined that the distance measurement (AF) is in focus (S208).

When it is determined that the distance measurement (AF) is in focus (S208), the system control circuit 50 stores the measurement data and/or the set parameters in the internal memory of the system control circuit 50 or the memory 52 and completes the distance measurement and photometry process routine performed in S122.

Figure 11:
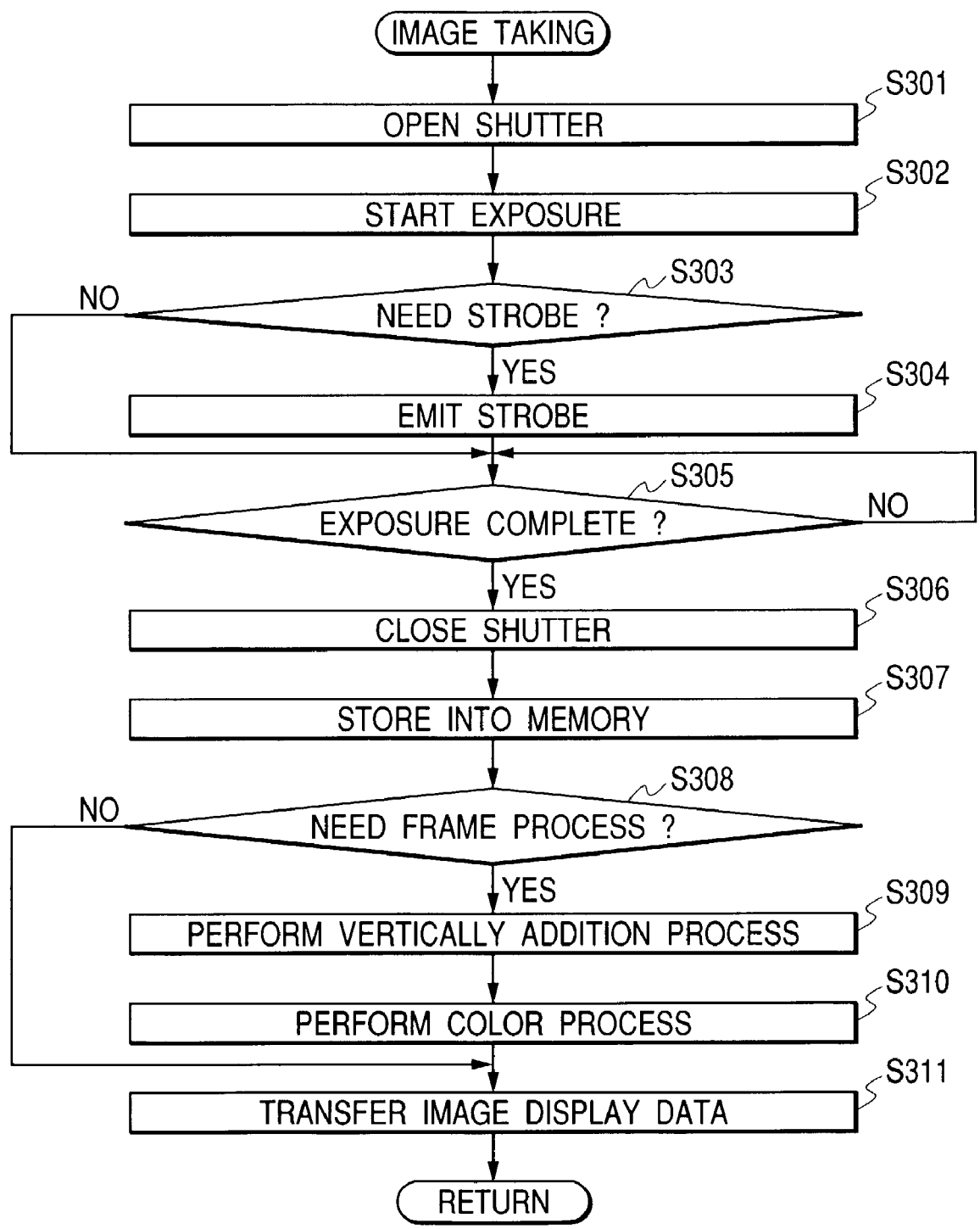
FIG. 11 is a flow chart showing an image taking routine of the image processing apparatus.

FIG. 11 is a flow chart showing a detailed flow of an image taking process in S129 of FIGS. 9A and 9B. The system control circuit 50 opens the shutter 12 having a lens stop function according to a lens stop value to expose the image pickup element 14 by the exposure control part 40 in accordance with photometry data to be stored in the internal memory of the system control circuit 50 or the memory 52 (S301, S302). The system control circuit 50 determines whether or not the strobe 48 is necessary by the strobe flag (S303) and, if it is necessary, causes the strobe to emit light (S304).

The system control circuit 50 waits completion of the exposure of the image pickup element 12 in accordance with the photometry data (S305), closes the shutter 12 (S306), reads out a charge signal from the image pickup element 14 and writes data of a taken image in the memory 30 via the A/D converter 16, the image processing circuit 20 and the memory control circuit 22 or directly via the memory control circuit 22 from the A/D converter 16 (S307).

If it is necessary to perform a frame process according to a set image taking mode (S308), the system control circuit 50 uses the memory control circuit 22 and, if necessary, the image processing circuit 20 to read out image data written in the memory 30 and performs a vertical addition process (S309) and a color process (S310) one by one and, then, writes the processed image data in the memory 30.

The system control circuit 50 reads out the image data from the memory 30 and transfers image display data to the image display memory 24 via the memory control circuit 22 (S311). Upon completion of a series of processes, the system control circuit 50 completes the image taking process routine performed in S129.

Figure 12:
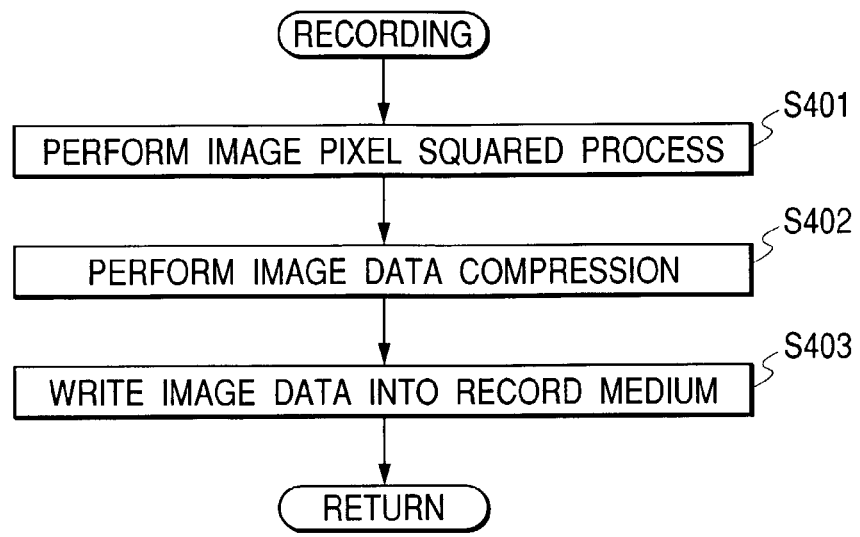
FIG. 12 is a flow chart showing a recording routine of the image processing apparatus.

FIG. 12 is a detailed flow chart of the record process in S134 of FIGS. 9A and 9B. The system control circuit 50 uses the memory control circuit 22 and, if necessary, the image processing circuit 20 to read out the taken image data written in the memory 30 and perform an image pixel squared process for interpolating a vertical and horizontal pixel ratio of the image pickup element to 1:1 (S401) and, then, writes the processed image data in the memory 30.

Then, the system control circuit 50 reads out the image data written in the memory 30 and performs an image compression process according to a set mode in the compression and expansion circuit 32 (S402) and, then, writes the compressed image data in the record medium 200 or 210 such as a memory card or a Compact Flash® card via the interface 90 or 94 or the connector 92 or 96 (S403). Upon completion of writing in the record medium, the system control circuit 50 completes the record process routine performed in S134.

Figure 13:
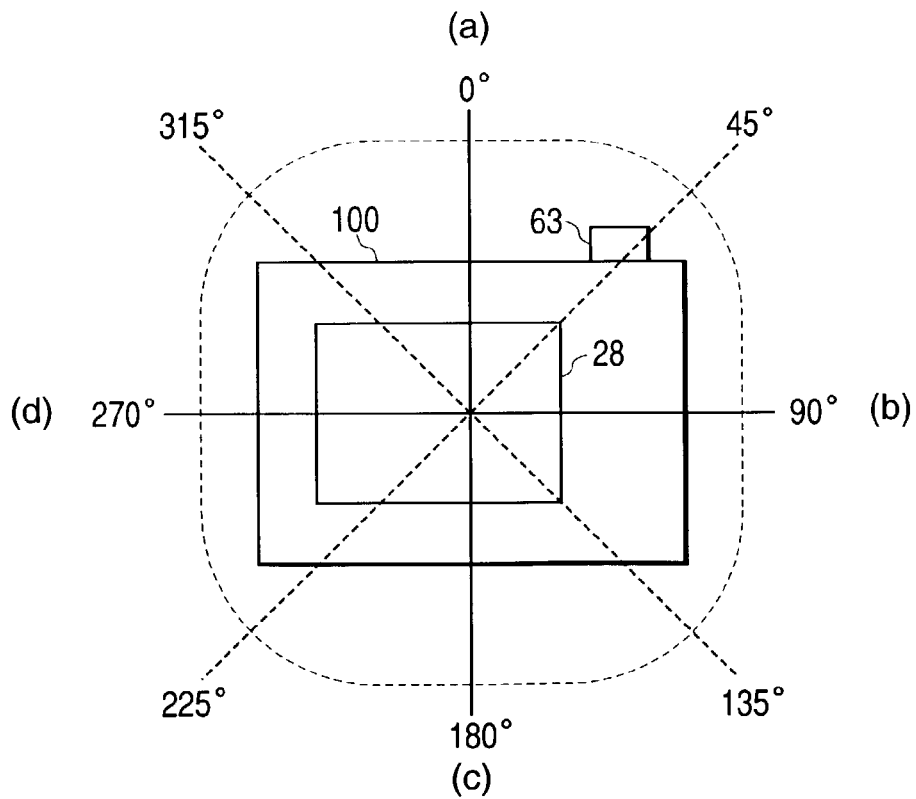
FIG. 13 is a chart showing a relationship between a rotation position of a camera and a posture flag that is judged by a posture detecting sensor.
Figure 15:
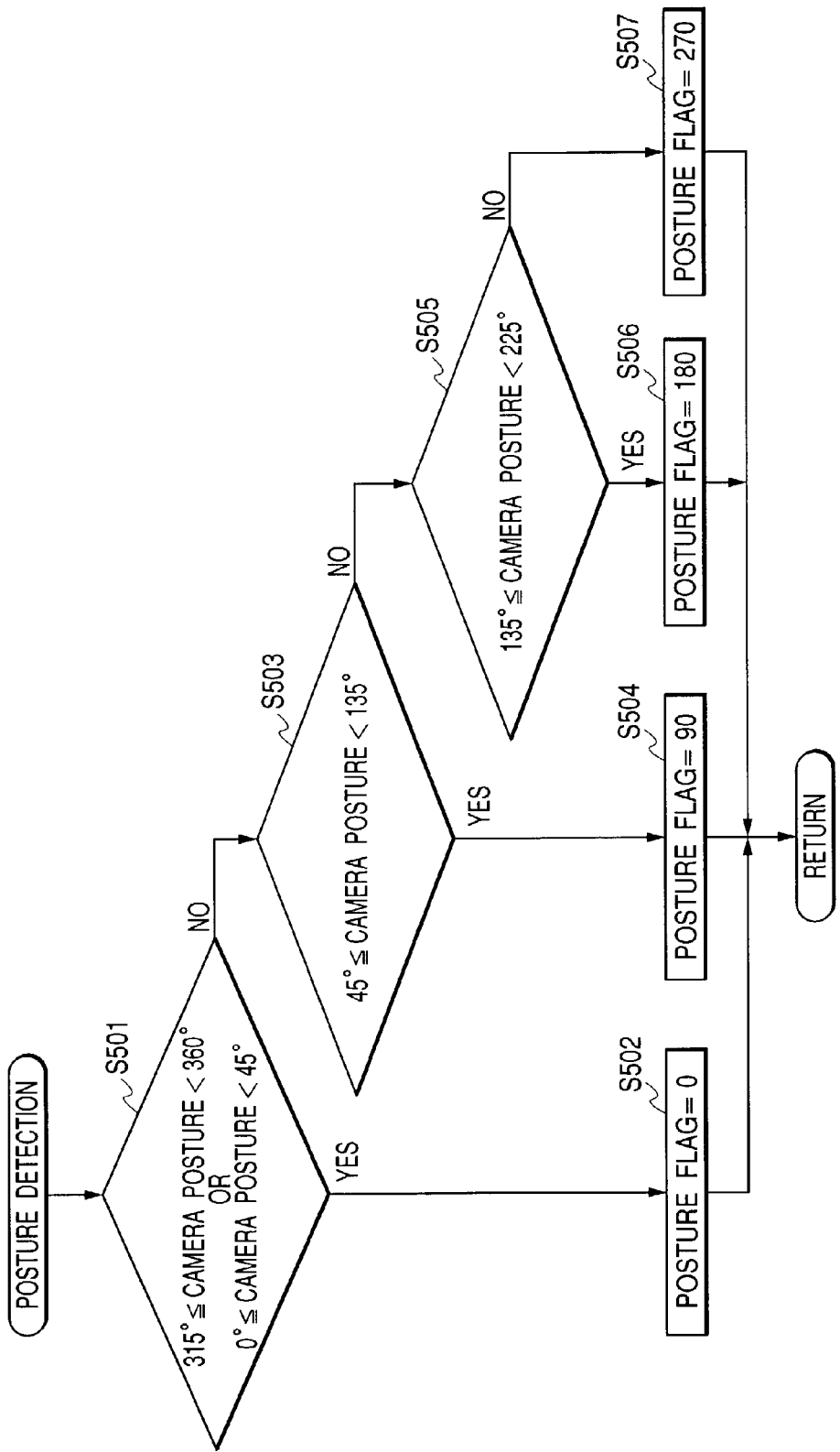
FIG. 15 is a flow chart showing a posture detection routine of the image processing apparatus.

FIG. 15 is a flow chart showing a detailed flow of the posture detection process in S1001 of FIG. 8 and S1003 of FIGS. 9A and 9B. First, FIG. 13 shows the relationship between a rotational position (posture) of a camera functioning as an actual image processing apparatus and a posture flag determined by a posture detection sensor. The rotational position at the time when the camera is in a regular position is assumed to be 0 degree. A position to which the camera rotates 315 degrees or more and less than 360 degrees or 0 degree or more and less than 45 degrees clockwise with respect to a vertical direction viewed from the image display part side (back side) is assumed to be a posture (a), a position to which the camera rotates 45 degrees or more and less than 135 degrees is assumed to be a posture (b), a position to which the camera rotates 135 degrees or more and less than 225 degrees is assumed to be a posture (c) and a position to which the camera rotates 225 degrees or more and less than 315 degrees is assumed to be a posture (d).

In FIG. 15, the system control circuit 50 determines if the posture detected by the posture detecting part 106 is the posture (a) (S501) and, if the camera is in the posture (a), sets 0 in the posture flag (S502). On the other hand, if the camera is not in the posture (a) in S501, the system control circuit 50 advances the flow to S503. Next, when the camera is in the posture (b), the system control circuit 50 sets 90 in the posture flag (S504). On the other hand, if the camera is not in the posture (b) in S503, the system control circuit 50 advances the flow to S505. When the camera is in the posture (c), the system control circuit 50 sets 180 in the posture flag (S506). On the other hand, if the camera is not in the posture (c), the system control circuit 50 sets 270 in the posture flag.

Figure 16:
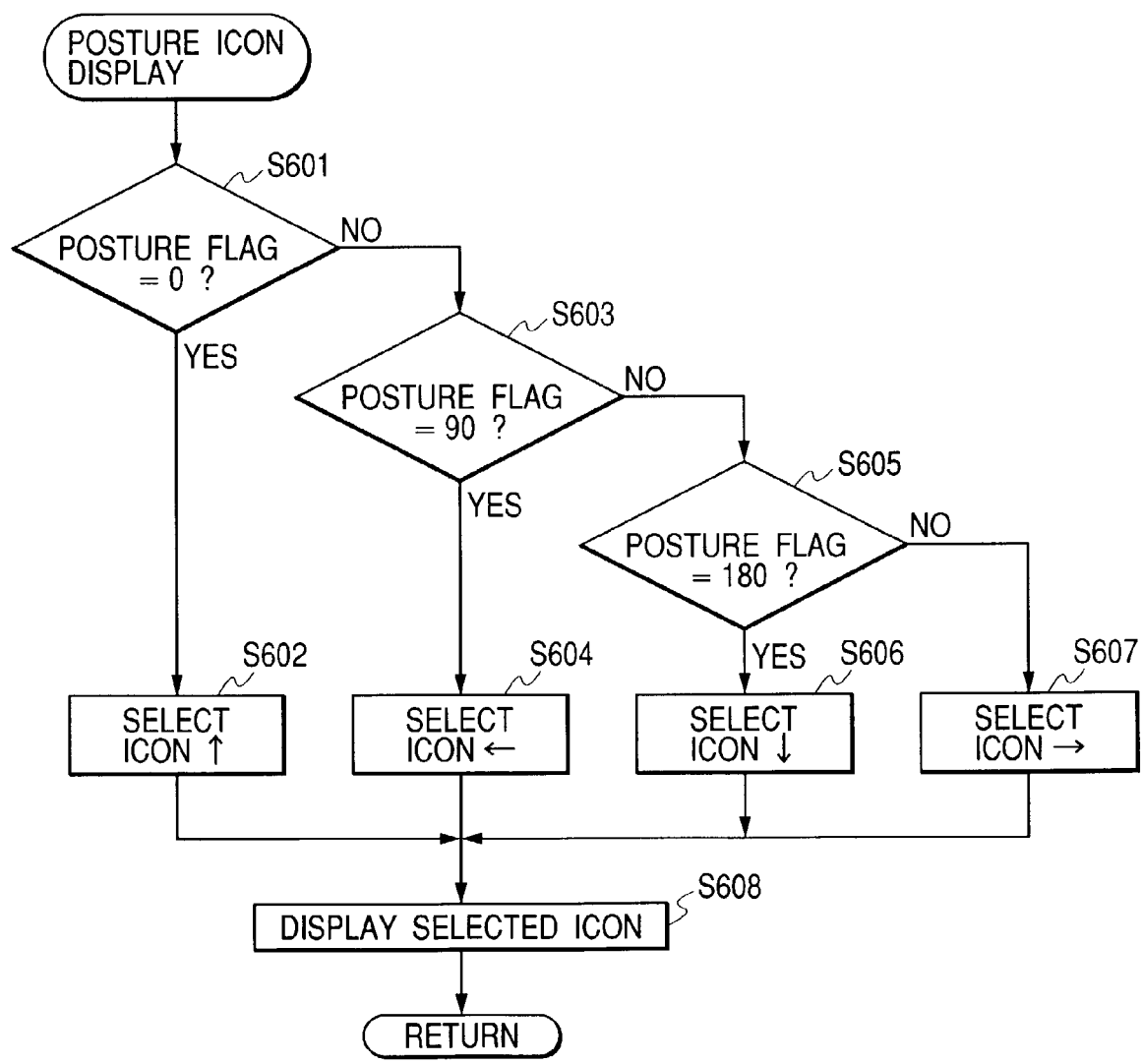
FIG. 16 is a flow chart showing a posture icon display routine of the image processing apparatus.

FIG. 16 is a flow chart showing a detailed flow of the posture icon display process in S1002 of FIG. 8 and S1004 of FIGS. 9A and 9B. The system control circuit 50 determines if a value of the posture flag is 0 (S601) and, if it is 0, selects an icon "↑" (S602) and advances the flow to S608. If a value of the posture flag is not 0, the system control circuit 50 advances the flow to S603. The system control circuit 50 determines if the value of the posture flag is 90 (S603) and, if it is 90, selects an icon "←" (S604) and advances the flow to S608. On the other hand, if the value of the posture flag is not 90, the system control circuit 50 advances the flow to S605. The system control circuit 50 determines if the value of the posture flag is 180 (S605) and, if it is 180, selects an icon "↓" (S606) and advances the flow to S608. On the other hand, if a value of the posture flag is not 180, the system control circuit 50 selects an icon "→" (S607) and advances the flow to S608. The system control circuit 50 displays the selected icon on the image display part 28 (S608) and completes the process.

Figure 14:
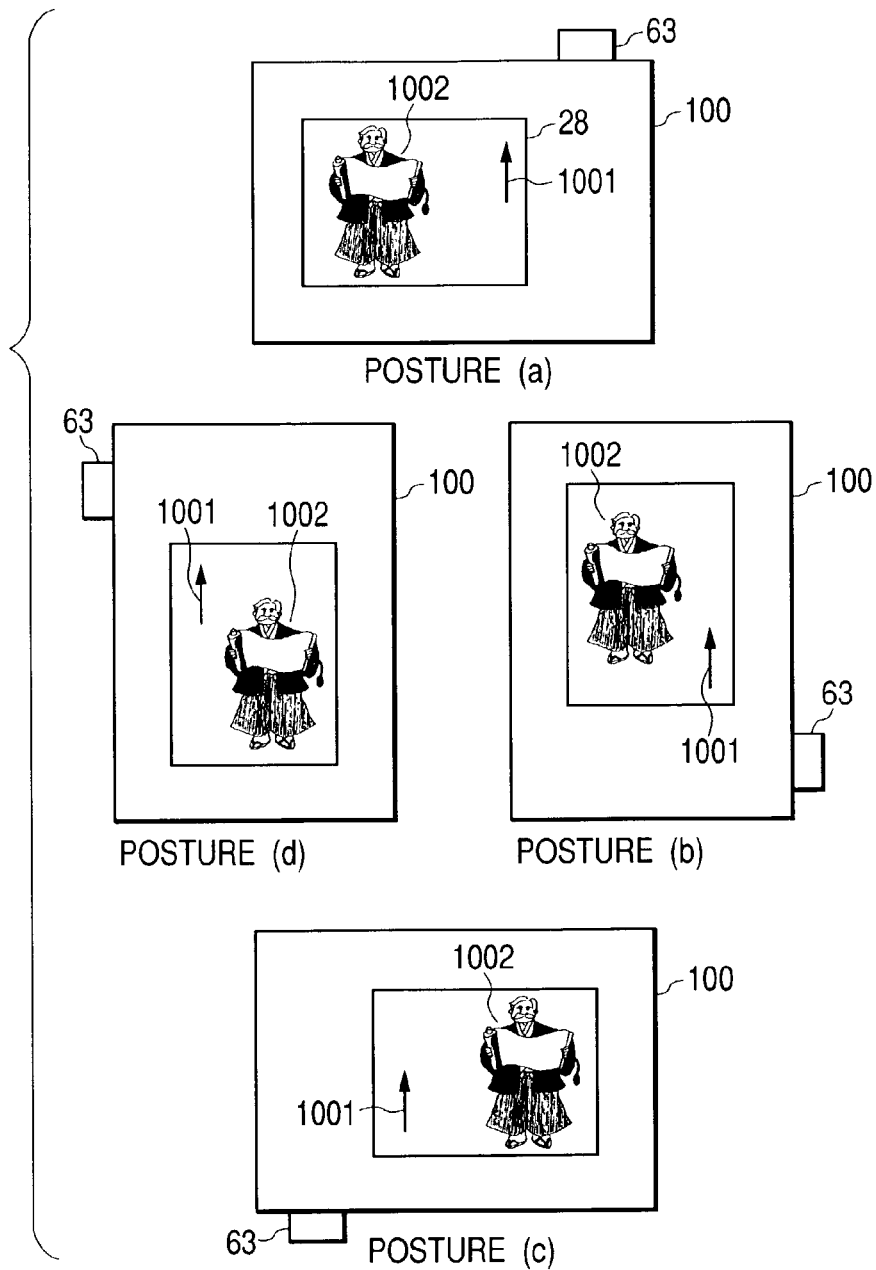
FIG. 14 illustrates examples of posture icon display of the image processing apparatus.

FIG. 14 illustrates an example of a screen that is displayed by the posture icon display process of FIG. 16. Reference numeral 1001 denotes an icon representing a posture and 1002 denotes a taken image. A screen of a posture (a), a screen of a posture (b), a screen of a posture (c) and a screen of a posture (d) are displayed when a value of the posture flag is 0, 90, 180 and 270, respectively. In this way, it becomes possible to inform a user of a posture of the image processing apparatus by indicating a top direction by an arrow among top and bottom directions.

Figure 17:
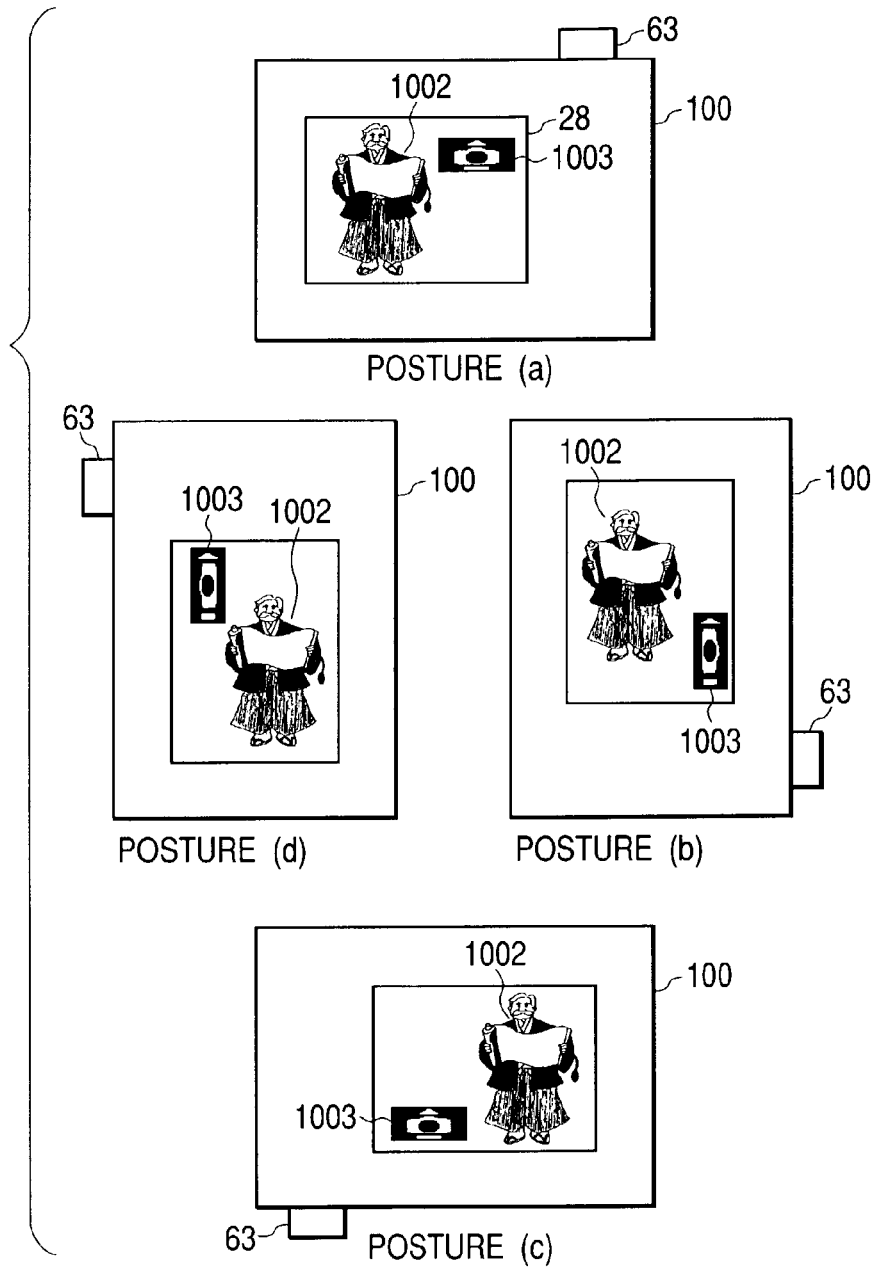
FIG. 17 illustrates examples of another posture icon display of the image processing apparatus.
Figure 18:
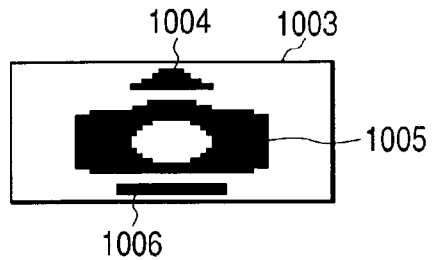
FIG. 18 illustrates the posture icon in FIG. 17 in more detail.

In the above-mentioned embodiment, the icon representing a posture is described as an arrow for simplicity of explanation. However, for example, a posture icon 1003 as shown in FIG. 17 may be displayed. FIG. 18 illustrates the posture icon 1003 shown in FIG. 17 in detail. Reference numeral 1004 denotes an icon representing a top side of the top and bottom directions; reference numeral 1005 denotes an icon representing a posture of an image processing apparatus itself; and reference numeral 1006 denotes an icon representing a bottom side of the top and bottom directions.

The posture (b) of FIG. 17 indicates the top and bottom directions and represents that a posture of the image processing apparatus is rotated by 90—clockwise with respect to the vertical direction as well. Similarly, in addition to indicating the top and bottom directions, the postures (a), (c) and (d) represent that a posture of the image processing apparatus is rotated by 0°, 180° and 270° clockwise, respectively, with respect to the vertical direction. According to the second embodiment, it becomes possible to inform a user of a posture of the image processing apparatus itself in addition to the top and bottom directions.

In addition, in the above-mentioned embodiment, the system control circuit 50 is described as updating an icon to be displayed according to 90-degree change in a posture. However, an updating process of an icon may be performed according to any angle change.

In addition, the system control circuit 50 may perform the posture detection process and the posture icon display process repeatedly while the through display is performed and, if a posture detected by the posture detecting part 106 has changed, an icon corresponding to a posture after the change may be immediately displayed on the image display part 28.

Further, in the above-mentioned embodiment, the system control circuit 50 is described as turning OFF all the elements constituting the image display part 28 in turning OFF the image display part 28. However, it is needless to mention that only a part of the elements of the image display part 28 may be turned OFF. Even in this case, a function of performing both the confirmation of a taken image and the saving of electric power can be provided. For example, if the image display part 28 is constituted by an LCD and a backlight, a function of performing both the confirmation of a taken image and the saving of electric power can be provided even if only the backlight is turned OFF while the LCD is kept ON as described in the embodiment.

In addition, the image display ON/OFF switch 66 and the quick review ON/OFF switch 68 are described as the structures independent from each other. However, it is needless to mention that the image display ON/OFF switch 66 and the quick review ON/OFF switch 68 may be assembled as one switch for both the purposes, which is provided with three positions of image display ON, image display ON only for quick review and image display OFF.

Further, the system control circuit 50 is described as determining the elapse of a minimum review time for continuing quick review display for a minimum time in instructing the finishing of quick review display by the image display part 28. However, it is needless to mention that the minimum review time may not be set. In this case, in FIGS. 9A and 9B, it is sufficient to remove the process for determining the elapse of the minimum review time in S137 from the flow chart.

In addition, as a structure provided with image display parts dedicated for through display and quick review display, respectively, a structure may be adopted which performs ON/OFF of these display parts according to setting of the image display ON/OFF switch and the quick review ON/OFF switch. In this case, a function of performing both the confirmation of a taken image and the saving of electric power can be provided as described in the embodiment.

Further, the system control circuit 50 is described as performing quick review display immediately after image taking regardless of setting of the quick review ON/OFF switch if the image display ON/OFF switch is ON. However, the system control circuit 50 may determine whether or not to perform the quick review display according to setting of the quick review ON/OFF switch if the image display ON/OFF switch is ON.

Next, as another embodiment of the present invention, if a camera is in a posture such that a strobe is positioned under a photographing lens, a function of performing alarm display for a user will be described.

Figure 19:
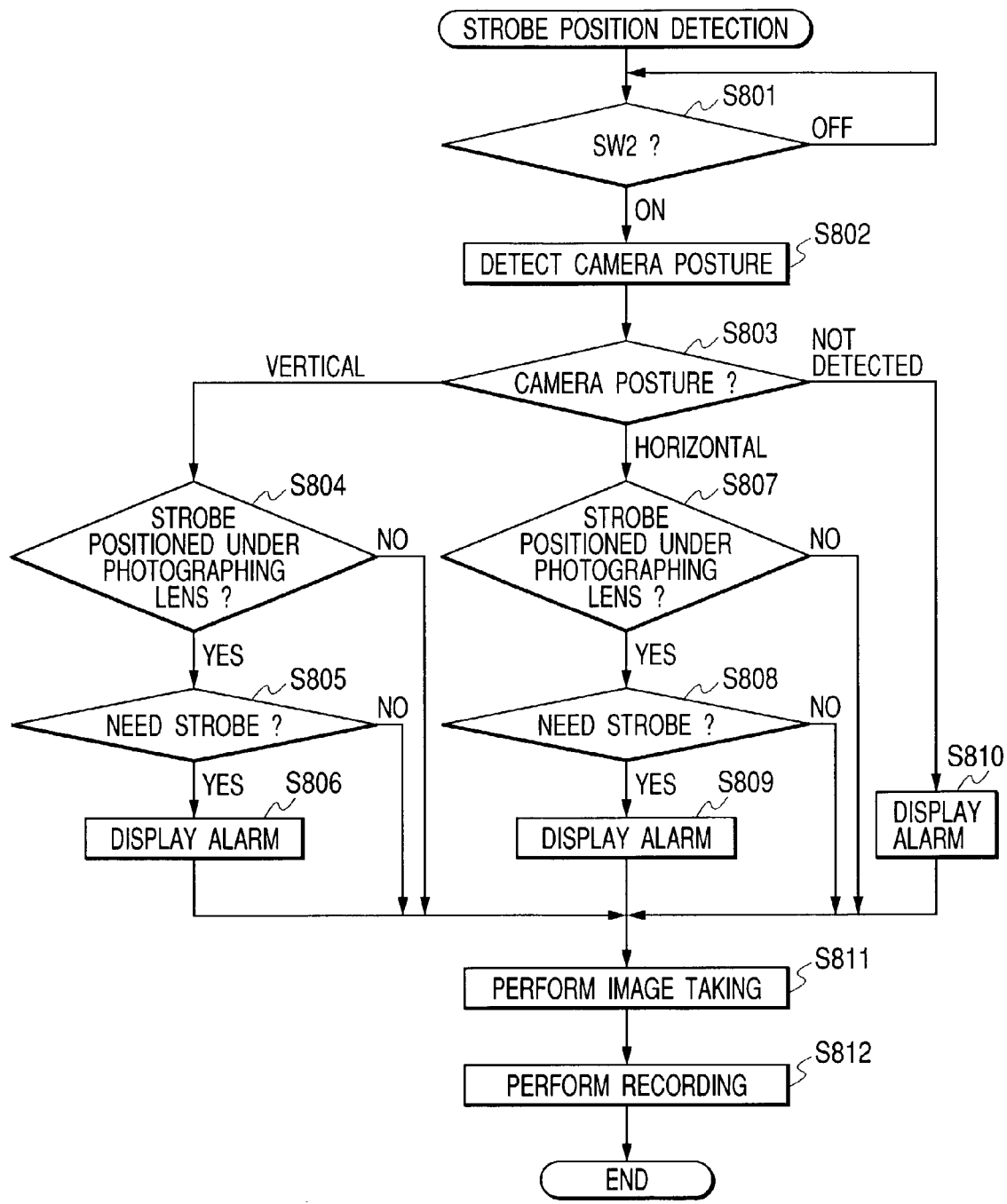
FIG. 19 is a flow chart showing a strobe position judgment routine of the image processing apparatus.
Figure 20:
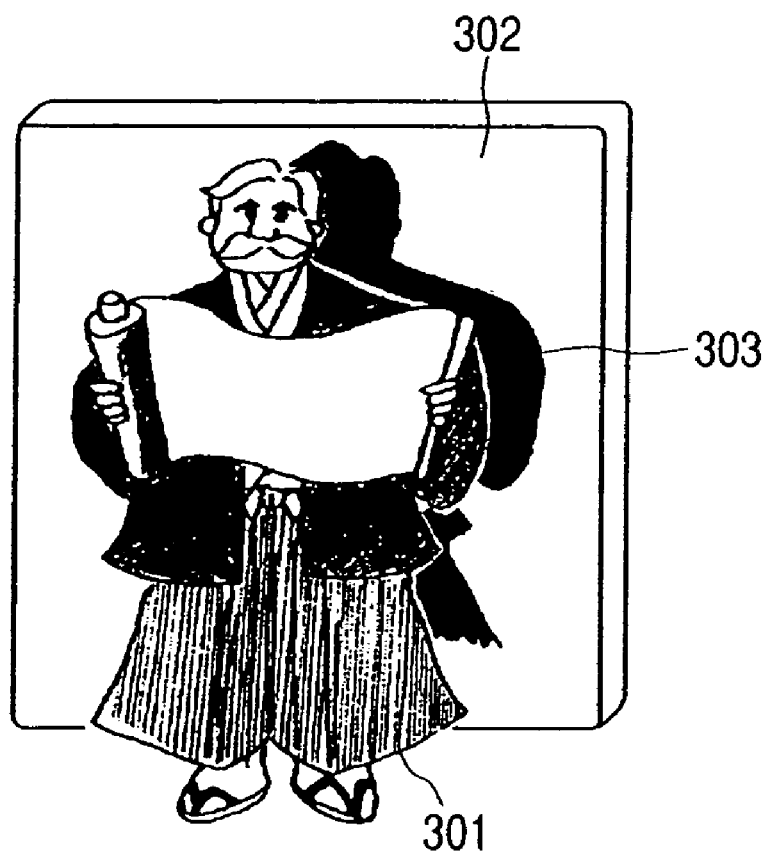
FIG. 20 illustrates a scene in which an unnatural shadow is generated behind a subject by light of a strobe.

FIG. 19 is a flow chart showing a strobe position determining routine. First, in step S801, the system control circuit 50 determine whether or not the shutter button SW2 is depressed and, if it is not pressed, stands by in this step until the shutter button SW2 is depressed. When the shutter button SW2 is depressed, the system control circuit 50 advances the flow to step S802 and detects the posture of the camera at the time of image taking from outputs of the gravity sensors 106A and 106B. Then, in the next step S803, the system control circuit 50 determines which state the posture of the camera takes and, if it takes a vertical position, the system control circuit 50 advances the flow to step S804. If it takes a horizontal position, the system control circuit 50 advances the flow to step S807. If it is impossible to detect the vertical position and the horizontal position in the gravity sensors 106A and 106B (as in the state shown in FIG. 6), the system control circuit 50 advances the flow to step S810. The vertical position in this context represents the posture (b) or the posture (d) in FIG. 13. In addition, the horizontal position represents the posture (a) or the posture (c) of FIG. 13.

Figure 4:
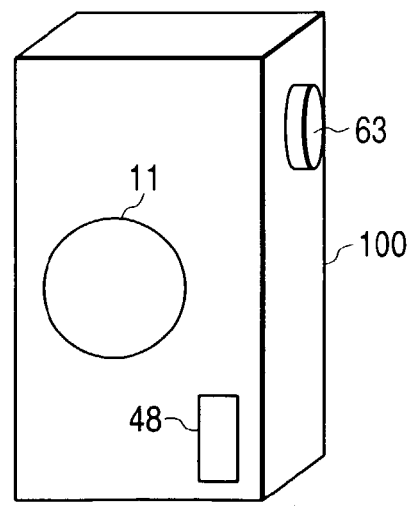
FIG. 4 is a perspective view showing a vertical position of the image processing apparatus.

If it is determined that the camera takes the vertical position as a result of the above-mentioned determination, the system control circuit 50 advances the flow to step S804 as described above, where the system control circuit 50 determines whether or not the strobe 48 is positioned under the photographing lens 10. If the strobe 48 is positioned under the photographing lens 10 as shown in FIG. 4 as a result of the determination the system control circuit 50 advances the flow to step S805 and determines whether or not it is necessary to irradiate a subject with illumination light using the strobe 48. If it is necessary to irradiate a subject with illumination light, the system control circuit 50 advances the flow to step S806, outputs an alarm signal from the alarm signal output part 107, performs alarm display by an LCD, an LED (light-emitting diode) or the like in the display part 54 within the finder and provides the alarm to the user. Then, the system control circuit 50 advances the flow to step S811.

In addition, if it is determined in step S804 that the strobe 48 is not positioned under the photographing lens 10 or if it is determined in step S805 that it is unnecessary to irradiate a subject with illumination light, the system control circuit 50 advances the flow to step S811 immediately.

If it is determined in step S803 that a posture of the camera is the horizontal position, the system control circuit 50 advances the flow to step S807 as described above, where the system control circuit 50 determines whether or not the strobe 48 is positioned under the photographing lens 10 as in step S804. If it is determined that the strobe 48 is positioned under the photographing lens 10 as a result of the determination, the system control circuit 50 advances the flow to step S808 and determines whether or not it is necessary to use the strobe 48 to irradiate a subject with illumination light. If it is necessary to irradiate illumination light, the system control circuit 50 advances the flow to step S809, outputs an alarm signal by the alarm signal output part 107, performs alarm display by an LCD, an LED or the like in the display part 54 within the finder and provides the alarm to the user. Then, the system control circuit 50 advances the flow to step S811. Note that, in the case in where the camera main body 100 takes the horizontal position, the state in which the strobe 48 is positioned under the photographing lens 10 is the state in which the camera is set upside down, that is, the posture (c) in FIG. 13.

In addition, if the photographing lens 10 of the camera main body 100 faces upward as shown in FIG. 6 and an elevation angle is equal to or larger than 70 degrees, positional information detected by the gravity sensors 106A and 106B do not coincide with each other in step S803. Then, the system control circuit 50 determines that it is impossible to detect the vertical position and the horizontal position in the gravity sensors 106A and 106B as described above and advances the flow to step 810. This is the same when it is attempted to perform image taking in the case where the photographing lens 10 of the camera main body 100 faces downward and positional information detected by the gravity sensors 106A and 106B do not coincide with each other. Then, in step S810, the system control circuit 50 outputs an alarm signal by the alarm signal output part 107, performs alarm display by an LCD, an LED or the like in the display part 54 within the finder and provides the alarm to the user. A type of the alarm in this case is set different from that in the case in which the strobe 48 is positioned under the photographing lens 10 such that both the alarms can be distinguished.

As described above, if the strobe 48 is positioned under the photographing lens 10, alarm display is performed in irradiating a subject with illumination light using the strobe 48 to perform image taking or in performing image taking in the undetectable state in which positional information detected by the gravity sensors 106A and 106B does not coincide with each other.

Thereafter, in step 811, the system control circuit 50 performs the image taking routine shown in FIG. 11 and, in step S812, performs the record routine shown in FIG. 12. This is the same in the case in which the user neglects the above-mentioned alarm display and performs image taking.

Further, in recording an image after image taking in an IC (integrated circuit) card such as a memory card, positional information (vertical position and horizontal position) of the camera at the time of image taking is simultaneously recorded. Similarly, in the case in which image taking is performed in the undetectable state, information to the effect that positional information of the camera at the time of image taking cannot be detected is recorded. In reproducing an image recorded in a memory card on an LCD or the like of the camera, an image taken in the vertical position is reproduced lengthwise and an image taken in the horizontal position is reproduced sideways from positional information of the camera recorded in the image. As to an image taken in the undetectable state, the image is reproduced sideways and information to the effect that positional information of the camera cannot be detected is simultaneously displayed.

Note that, although an example of the image processing apparatus incorporating a strobe is shown in the above-mentioned embodiment, the present invention is not limited to this but can be similarly applied to the case in which the image processing apparatus is used in combination with an externally attached strobe.

In the above-mentioned embodiment, it is needless to mention that the record media 200 and 210 may be constituted not only by memory card such as a PCMCIA card or a Compact Flash®, a hard disk or the like but also by a micro DAT, a magneto-optical disk, an optical disk such as a CD-R or a CD-WR, a phase-changing optical disk such as a DVD or the like.

In addition, it is needless to mention that the record media 200 and 210 may be a composite medium in which a memory card, a hard disk and the like are integrated. Moreover, a part of the composite medium may be detachably attachable.

Further, in the above-mentioned embodiment, the record media 200 and 210 are described as being separated from the image processing apparatus 100 and arbitrarily connectable with each other. However, it is needless to mention that any one of or all of the record media may be fixed to the image processing apparatus 100.

In addition, an arbitrary number of record media 200 and 210 may be made connectable to the image processing apparatus 100. Then, although the record media 200 and 210 are described as being inserted in the image processing apparatus 100, it is needless to mention that record media may be constituted by any combination of singular or plural record media.

In addition, it is needless to mention that the object of the present invention is attained by supplying a record medium having a program code of software for realizing the functions of the aforementioned embodiments stored therein to a system or an apparatus, and reading out and executing the program code stored in the record medium by a computer (or a CPU or an MPU) of the system or the apparatus.

In this case, the program code itself read out from the record medium realizes the functions of the aforementioned embodiments, and the record medium having the program code stored therein constitutes the present invention.

As the record medium for supplying a program code, for example, a flexible disk, a hard disk, an optical disk, a magneto-optical disk, a CD-ROM, a CD-R, a magnetic tape, a nonvolatile memory card, a ROM and the like can be used.

In addition, it is needless to mention that the present invention includes not only the case in which the functions of the aforementioned embodiments are realized by executing a program code read out by a computer but also the case in which an OS (operating system) or the like running on the computer performs a part or all of actual processes based on an instruction of the program code, and the functions of the aforementioned embodiments are realized by the processes.

Moreover, it is needless to mention that the present invention includes the case where a program code read out from a record medium is written in a memory provided in a function extending board inserted in a computer or a function extending unit connected to the computer and, then, a CPU or the like provided in the function extending board or the function extending unit performs a part or all of actual processes based on an instruction of the program code, and the functions of the aforementioned embodiments are realized by the processes.

In addition, although the descriptions have been made with a digital camera as an example, the present invention can be applied to a silver salt camera except that posture information (position information) of a camera is recorded and displayed in an image after image taking in the digital camera.

What is claimed is:

1. An image processing apparatus for informing a user of the posture thereof comprising:
    an image pickup element;
    a posture detecting device configured to detect posture information of the image pickup element;
    an operation member;
    a control circuit configured to execute an image taking process for storing the image data obtained from an output of the image pickup element and the posture information detected by the posture detecting device on a recording medium, in accordance with an operation of the operation member; and
    a display device configured to display an image representing a visual facsimile of said image processing apparatus whose posture reflects the posture of said image processing apparatus, the visual facsimile including visually distinguishable representations of the top and bottom of said image processing apparatus the posture of said image processing apparatus and to rotate the image representing the posture of said image processing apparatus based on the image data stored in the recording medium, using the posture information stored in the recording medium, and display the thus rotated image,
    wherein the posture information indicates angles which are set stepwise and the image to be displayed by said display device is allowed to be rotated based on any of the angles, and
    wherein said display device is configured to continuously display an image based on the output of the image pickup element and the image representing the posture of said image processing apparatus based on the posture information detected by said posture detecting device, before the execution of the image taking process, in accordance with an operation of said operation member.

2. An image processing apparatus according to claim 1, wherein the posture detecting device is configured to detect a change of the posture of the image pickup element, and
    wherein the display device continuously displays an image based on the output of the image pickup element and the posture information after detection of the change of the posture.

3. An image processing apparatus according to claim 1, wherein the display device displays information designating the vertical direction, as the posture information.

4. An image processing apparatus according to claim 1, wherein the display device displays information in accordance with a posture of the image processing apparatus, as the posture information.

5. An image processing apparatus according to claim 1, further comprising a setting member configured to switch over the image processing apparatus between an image taking mode in which the image data obtained from the output of the image pickup element is stored on the recording medium and an image reproducing mode in which an image is reproduced on the display device based on the image data obtained in the image taking mode, and
    wherein in the image taking mode, the display device continuously displays an image by using the output of the image pickup element and the posture information detected by the posture detecting device.

6. An image processing apparatus according to claim 5, wherein in the image reproducing mode, said display device is configured to rotate an image produced based on the image data stored in the recording medium, using the posture information stored in the recording medium.

7. An image processing apparatus according to claim 1, wherein said display device is configured to rotate, in units of 90-degrees, the image produced based on the image data stored in the recording medium, using the posture information stored in the recording medium, and to display the thus rotated image.

8. An image processing method for informing a user of the posture of an image processing apparatus comprising:
    a posture detecting step for detecting posture information of an image pickup element of the image processing apparatus;
    a display step for displaying an image representing a visual facsimile of said image processing apparatus whose posture reflects the posture of said image processing apparatus, the visual facsimile including visually distinguishable representations of the top and bottom of said image processing apparatus and for rotating the image representing the posture of the image processing apparatus based on the image data stored in a recording medium, using the posture information detected by said posture detecting step, and displaying the thus rotated image; and
    an image taking step for storing image data obtained from the output of the image pickup element and the posture information detected by said posture detecting step, on a recording medium, in accordance with an operation of an operation member, wherein the posture information indicates angles which are set stepwise and wherein said displaying step rotates the image based on any of the angles, and wherein said displaying step continuously displays an image based on the output of the image pickup element and the image representing the posture of the image processing apparatus based on the posture information detected by said posture detecting step, before the execution of the image taking step, in accordance with an operation of the operation member.

9. An image processing method according to claim 8, wherein when a change of the posture of the image pickup element is detected at the posture detecting step, an image based on the output of the image pickup element and the posture information after detection of the change of the posture are displayed at the display step.

10. An image processing method according to claim 8, wherein information designating the vertical direction is displayed as the posture information at the display step.

11. An image processing method according to claim 8, wherein information in accordance with the posture of an apparatus executing the image processing method is displayed as the posture information at the display step.

12. An image processing method according to claim 8, further comprising a setting step for switching over between an image taking mode in which the image data obtained from the output of the image pickup element is stored on the recording medium and an image reproducing mode in which an image is reproduced on a display device based on the image data obtained in the image taking mode, and wherein in the image taking mode, the display device continuously displays an image by using the output of the image pickup element and the posture information detected by the posture detection step.

* * * * *

UNITED STATES PATENT AND TRADEMARK OFFICE
CERTIFICATE OF CORRECTION

| | |
|---|---|
| PATENT NO. | : 7,375,755 B2 |
| APPLICATION NO. | : 10/227946 |
| DATED | : May 20, 2008 |
| INVENTOR(S) | : Takahiro Oya et al. |

It is certified that error appears in the above-identified patent and that said Letters Patent is hereby corrected as shown below:

COLUMN 6
Line 31, "images" should read --image--.

COLUMN 17
Line 48, "where" should read --which--.

COLUMN 19
Line 56, "the posture of said image processing apparatus" should be deleted.

Signed and Sealed this

Twenty-seventh Day of January, 2009

JOHN DOLL
*Acting Director of the United States Patent and Trademark Office*